US011125719B2

(12) United States Patent
Nakagaki

(10) Patent No.: US 11,125,719 B2
(45) Date of Patent: Sep. 21, 2021

(54) GAS SENSOR

(71) Applicant: NGK INSULATORS, LTD., Nagoya (JP)

(72) Inventor: Kunihiko Nakagaki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/701,186

(22) Filed: Dec. 3, 2019

(65) Prior Publication Data
US 2020/0103368 A1 Apr. 2, 2020

Related U.S. Application Data

(63) Continuation of application No. PCT/JP2018/047885, filed on Dec. 26, 2018.

(30) Foreign Application Priority Data

Dec. 26, 2017 (JP) .............................. JP2017-249914

(51) Int. Cl.
*G01N 27/419* (2006.01)
*G01N 27/407* (2006.01)
*G01N 27/409* (2006.01)

(52) U.S. Cl.
CPC ......... *G01N 27/419* (2013.01); *G01N 27/409* (2013.01); *G01N 27/4072* (2013.01); *G01N 27/4076* (2013.01)

(58) Field of Classification Search
CPC ... G01N 27/419; G01N 27/407; G01N 27/409
See application file for complete search history.

(56) References Cited

U.S. PATENT DOCUMENTS 6,036,841 A * 3/2000 Kato .................. G01N 27/4074
204/425
6,045,673 A * 4/2000 Kato .................... G01N 27/419
204/425

(Continued)

FOREIGN PATENT DOCUMENTS

DE 10 2008 006 633 A1 7/2009
JP 2001-133447 A 5/2001

(Continued)

OTHER PUBLICATIONS

International Search Report of and Written Opinion of PCT/JP2018/047885 dated Mar. 5, 2019.

(Continued)

*Primary Examiner* — Luan V Van
*Assistant Examiner* — Caitlyn Mingyun Sun
(74) *Attorney, Agent, or Firm* — Mattingly & Malur, PC

(57) ABSTRACT

A gas sensor is capable of measuring the concentrations of each of a plurality of target components in a gas being measured. The gas sensor has a sensor element, and one or more processors configured to control an oxygen concentration and to acquire a target component concentration. The oxygen concentration is controlled in a first chamber and a second chamber of a first sensor cell, and the oxygen concentration is also controlled in a second chamber of a second sensor cell. The concentration of a second target component is acquired on the basis of a difference Δlp between a first pump current value and a second pump current value, and the concentration of a first target component is acquired by subtracting the concentration of the second target component from the second pump current value (total concentration).

16 Claims, 15 Drawing Sheets

(56) References Cited

U.S. PATENT DOCUMENTS

| | | | |
|---|---|---|---|
| 6,120,663 A * | 9/2000 | Kato | G01N 27/419 204/401 |
| 2007/0080074 A1 | 4/2007 | Wang et al. | |
| 2012/0211374 A1 * | 8/2012 | Kato | G01N 27/419 205/781 |
| 2015/0276659 A1 | 10/2015 | Sekiya et al. | |
| 2017/0102354 A1 * | 4/2017 | Aoki | G01N 27/417 |

FOREIGN PATENT DOCUMENTS

| | | |
|---|---|---|
| JP | 2009-511859 A | 3/2009 |
| JP | 2009-243942 A | 10/2009 |
| JP | 2012-173014 A | 9/2012 |
| JP | 2013-068632 A | 4/2013 |
| JP | 2013-221931 A | 10/2013 |
| JP | 2015-200643 A | 11/2015 |
| WO | 2017222002 A1 | 12/2017 |

OTHER PUBLICATIONS

Extended European Search Report received in corresponding European Application No. 18895461.4 dated Jun. 19, 2020.

* cited by examiner

FIG. 7

|  | NO | NH3 | SENSOR CELL 2 | SENSOR CELL 1 | SENSOR CELL 2 - SENSOR CELL 1 |
|---|---|---|---|---|---|
| [1] | 0 | 100 | 2.428 | 2.126 | 0.302 |
|  | 0 | 75 | 1.822 | 1.595 | 0.226 |
|  | 0 | 50 | 1.216 | 1.065 | 0.151 |
|  | 0 | 25 | 0.609 | 0.534 | 0.075 |
|  | 0 | 0 | 0.003 | 0.003 | 0.000 |
| [2] | 100 | 0 | 2.137 | 1.997 | 0.140 |
|  | 75 | 0 | 1.604 | 1.498 | 0.105 |
|  | 50 | 0 | 1.070 | 1.000 | 0.070 |
|  | 25 | 0 | 0.537 | 0.501 | 0.035 |
|  | 0 | 0 | 0.003 | 0.003 | 0.000 |
| [3] | 100 | 0 | 2.137 | 1.997 | 0.140 |
|  | 80 | 17.6 | 2.137 | 1.972 | 0.165 |
|  | 60 | 35.2 | 2.137 | 1.947 | 0.190 |
|  | 40 | 52.8 | 2.137 | 1.922 | 0.215 |
|  | 20 | 70.4 | 2.137 | 1.897 | 0.240 |
|  | 0 | 88.0 | 2.137 | 1.871 | 0.266 |
| [4] | 50 | 0.0 | 1.070 | 1.000 | 0.070 |
|  | 40 | 8.8 | 1.070 | 0.987 | 0.083 |
|  | 30 | 17.6 | 1.070 | 0.975 | 0.095 |
|  | 20 | 26.4 | 1.070 | 0.962 | 0.108 |
|  | 10 | 35.2 | 1.070 | 0.950 | 0.120 |
|  | 0 | 44.0 | 1.070 | 0.937 | 0.133 |
| [5] | 25 | 0 | 0.537 | 0.501 | 0.035 |
|  | 20 | 4.4 | 0.537 | 0.495 | 0.041 |
|  | 15 | 8.8 | 0.537 | 0.489 | 0.048 |
|  | 10 | 13.2 | 0.537 | 0.483 | 0.054 |
|  | 5 | 17.6 | 0.537 | 0.476 | 0.060 |
|  | 0 | 22.0 | 0.537 | 0.470 | 0.066 |

FIG. 8

|  | NO | NH3 | SENSOR CELL 2 | SENSOR CELL 1 | SENSOR CELL 2 - SENSOR CELL 1 |
|---|---|---|---|---|---|
|  | 60 | 35.0 | 2.132 | 1.942 | 0.190 |
| [CONFIRMATION] | 30 | 18.0 | 1.080 | 0.983 | 0.096 |
|  | 10 | 13.0 | 0.532 | 0.478 | 0.053 |

GAS SENSOR

CROSS-REFERENCE TO RELATED APPLICATIONS

This application is a Continuation of International Application No. PCT/JP2018/047885 filed on Dec. 26, 2018, which is based upon and claims the benefit of priority from Japanese Patent Application No. 2017-249914 filed on Dec. 26, 2017, the contents all of which are incorporated herein by reference.

TECHNICAL FIELD

The present invention relates to a gas sensor, which is capable of measuring respective concentrations of a plurality of target components in a gas to be measured.

BACKGROUND ART

Conventionally, a NOx sensor (a serially arranged two-chamber type NOx sensor) having a serially arranged two-chamber structure, and a NOx measurement method using the same (for example, refer to Japanese Laid-Open Patent Publication No. 2015-200643), and a mixed potential type, or a variable resistance type $NO_2$ sensor in which an oxide semiconductor electrode is used, or an $NH_3$ sensor are known (for example, refer to Japanese Laid-Open Patent Publication No. 2013-068632 and Japanese Laid-Open Patent Publication No. 2009-243942).

Further, a method of measuring an $NH_3$ concentration using a mixed potential of an oxide semiconductor electrode is known. This method is a method in which the NOx concentration is measured by another sensor, and in the case that NO and $NO_2$ are not present, the mixed potential of the oxide semiconductor electrode is used as is, whereas, in the case that NO and $NO_2$ are present, a correction is added to the mixed potential of the oxide semiconductor electrode (see, for example, Japanese Laid-Open Patent Publication No. 2009-511859 (PCT)).

SUMMARY OF INVENTION

In recent years, there is a tendency for regulations in regard to $CO_2$ emission levels to be strengthened, and the adoption rate of diesel vehicles is increasing in respective countries. Diesel engines using lean combustion possess a disadvantage in that it is difficult to purify NOx in exhaust gas that contains an excessive amount of oxygen instead of a small amount of $CO_2$ emissions. For this reason, similar to strengthening regulations concerning $CO_2$ emissions, regulations concerning NOx emissions are also being strengthened. Currently, a selective reduction type catalyst system (hereinafter referred to as an SCR system) which can perform NOx purification without impairing $CO_2$ emission, that is, without a loss in fuel consumption, occupies the mainstream of NOx purification. In such an SCR system, injected urea is reacted with exhaust gas to produce ammonia, and the ammonia and NOx are reacted and are thereby decomposed into $N_2$ and $O_2$. In the SCR system, in order that the NOx purification efficiency is made close to 100%, it is necessary to increase the injected amount of urea. However, if the injected amount of urea is increased, unreacted ammonia may be discharged into the atmosphere. Therefore, a sensor capable of distinguishing between NOx and ammonia is required.

Furthermore, in the United States, preparations are being advanced with respect to obligations for individual failure diagnosis of oxidation catalysts (hereinafter referred to as DOC catalysts), diesel particulate filters (hereinafter referred to as DPF), and selective reduction type catalysts (hereinafter referred to as SCR catalysts). Although failure diagnosis of DPF and SCR catalysts are possible with existing PM sensors and NOx sensors, an effective failure diagnosis technique has not been discovered with respect to DOC catalysts. Currently, a method of measuring an amount of hydrocarbons (hereinafter referred to as HC) leaking downstream from a DOC catalyst at a low temperature of 200° C. or less, and a method of judging a failure from a ratio of NO and $NO_2$ that are discharged downstream from a DOC catalyst are recommended. In particular, in the ratio of NO and $NO_2$, since a reduction in $NO_2$ occurs earlier than an increase in the HC outflow amount, such a method is expected to be a safer method of fault diagnosis. For this purpose, a sensor that is capable of distinguishing between NO and $NO_2$ is demanded.

In the NOx sensor and the NOx measurement method described in the aforementioned Japanese Laid-Open Patent Publication No. 2015-200643, NO, $NO_2$, and $NH_3$ are converted into NO, and after conversion thereof, the NO is decomposed, and a generated amount or a concentration of $O_2$ is measured. Therefore, although the total amount of NO, $NO_2$, and $NH_3$ can be measured, it is not possible to distinguish between these respective components.

Although the oxide semiconductor electrodes described in Japanese Laid-Open Patent Publication No. 2013-068632 and Japanese Laid-Open Patent Publication 2009-243942 are excellent in terms of the selectivity of NO and $NO_2$, on the other hand, since the sensitivity output characteristics with respect to NO and $NO_2$ are opposite in polarity, under an atmosphere in which both NO and $NO_2$ coexist, it has not been possible to correctly measure the concentration of NO or $NO_2$.

In the sensor described in Japanese Laid-Open Patent Publication No. 2009-511859 (PCT), it is difficult to accurately measure an $NH_3$ concentration over a prolonged time period, due to the instability of the oxide semiconductor electrode within the exhaust gas, and the weak adhesion strength with the substrate.

The present invention has been devised taking into consideration the aforementioned problems, and has the object of providing a gas sensor, in which it is possible to accurately measure over a prolonged time period the concentration of a non-combusted component such as exhaust gas, and a plurality of components (for example, NO, $NO_2$, and $NH_3$) that coexist in the presence of oxygen.

[1] An aspect of the present invention is characterized by a gas sensor configured to measure concentrations of a first target component and a second target component, including a sensor element including a structural body made up from at least an oxygen ion conductive solid electrolyte, and a first sensor cell and a second sensor cell formed in the structural body, a temperature control unit adapted to control a temperature of the sensor element, an oxygen concentration measurement unit, and a target component concentration acquisition unit, wherein each of the first sensor cell and the second sensor cell includes a gas introduction port, a first diffusion rate control portion, a first chamber, a second diffusion rate control portion, a second chamber, a third diffusion rate control portion, and a measurement chamber, which are arranged in this order in a direction in which gas is introduced, the measurement chamber of the first sensor cell is equipped with a first target component measurement pump cell, the measurement chamber of the second sensor cell is equipped with a second target component measurement pump cell, and the oxygen concentration control unit controls the oxygen concentrations of the first chamber and the second chamber of the first sensor cell, and the oxygen concentration of the second chamber of the second sensor cell. In addition, in the target component concentration acquisition unit, a concentration of the second target component is acquired on the basis of a difference between a current value flowing to the first target component measurement pump cell, and a current value flowing to the second target component measurement pump cell, a total concentration of the first target component and the second target component is acquired by the current value flowing to the second target component measurement pump cell, and a concentration of the first target component is acquired by subtracting the concentration of the second target component from the total concentration.

[2] In the aspect of the present invention, the gas sensor may further include a preliminary adjustment pump cell disposed inside the first chamber of the first sensor cell, a first oxygen concentration adjustment pump cell disposed inside the second chamber of the first sensor cell, and a second oxygen concentration adjustment pump cell disposed inside the second chamber of the second sensor cell, and wherein the oxygen concentration control unit includes a preliminary oxygen concentration control unit adapted to control the oxygen concentration of the first chamber of the first sensor cell by controlling the preliminary adjustment pump cell, a first oxygen concentration control unit adapted to control the oxygen concentration of the second chamber of the first sensor cell by controlling the first oxygen concentration adjustment pump cell, and a second oxygen concentration control unit adapted to control the oxygen concentration of the second chamber of the second sensor cell by controlling the second oxygen concentration adjustment pump cell.

[3] In the aspect of the present invention, the second chamber of the first sensor cell may include a first main adjustment chamber in communication with the first chamber of the first sensor cell, and a first auxiliary adjustment chamber in communication with the first main adjustment chamber, the second chamber of the second sensor cell may include a second main adjustment chamber in communication with the first chamber of the second sensor cell, and a second auxiliary adjustment chamber in communication with the second main adjustment chamber, the measurement chamber of the first sensor cell may be in communication with the first auxiliary adjustment chamber, and the measurement chamber of the second sensor cell may be in communication with the second auxiliary adjustment chamber.

[4] In the aspect of the present invention, fourth diffusion rate control portions may be included, respectively, between the first main adjustment chamber and the first auxiliary adjustment chamber, and between the second main adjustment chamber and the second auxiliary adjustment chamber.

[5] In the aspect of the present invention, pump electrodes may be included respectively in the first chamber and the second chamber of the first sensor cell, and the second chamber of the second sensor cell, measurement electrodes may be included respectively in the measurement chamber of the first sensor cell and the measurement chamber of the second sensor cell, and each of the pump electrodes may be made of a material having a catalytic activity lower than that of the respective measurement electrodes.

[6] In the aspect of the present invention, the first target component may be NO, and the second target component may be $NH_3$.

[7] In the aspect of the present invention, the oxygen concentration control unit may control the oxygen concentration inside the first chamber under a condition in which $NH_3$ is oxidized without causing decomposition of NO inside the first chamber of the first sensor cell, and may control the oxygen concentration inside the second chamber under a condition in which $NH_3$ is oxidized without causing decomposition of NO inside the second chamber of the second sensor cell.

[8] In the aspect of the present invention, the target component concentration acquisition unit may utilize a first map in which there is specified a relationship between a NO concentration and an $NH_3$ concentration, respectively, by a current value flowing to the second target component measurement pump cell, and a difference between a current value flowing to the first target component measurement pump cell and the current value flowing to the second target component measurement pump cell, the current value and the difference being experimentally measured in advance, and may determine each of the concentrations of NO and $NH_3$ by comparing with the first map the current value flowing to the second target component measurement pump cell during actual use, and the difference between the current value flowing to the first target component measurement pump cell and the current value flowing to the second target component measurement pump cell.

[9] In the aspect of the present invention, the first target component may be NO, and the second target component may be $NO_2$.

[10] In the aspect of the present invention, the oxygen concentration control unit may control the oxygen concentration inside the first chamber under a condition in which $NO_2$ is decomposed without causing decomposition of NO inside the first chamber of the first sensor cell, and may control the oxygen concentration inside the second chamber under a condition in which $NO_2$ is decomposed without causing decomposition of NO inside the second chamber of the second sensor cell.

[11] In the aspect of the present invention, the target component concentration acquisition unit may utilize a second map in which there is specified a relationship between a NO concentration and a $NO_2$ concentration, respectively, by a current value flowing to the second target component measurement pump cell, and a difference between a current value flowing to the first target component measurement pump cell and the current value flowing to the second target component measurement pump cell, the current value and the difference being experimentally measured in advance, and may determine each of the concentrations of NO and $NO_2$ by comparing with the second map the current value flowing to the second target component measurement pump cell during actual use, and the difference between the current value flowing to the first target component measurement pump cell and the current value flowing to the second target component measurement pump cell.

[12] In the aspect of the present invention, there may further be included an oxygen concentration control unit adapted to measure an oxygen concentration on the basis of a pump current value flowing to the second oxygen concentration adjustment pump cell.

[13] In the aspect of the present invention, a first exterior side pump electrode disposed on an outer side of at least the second chamber of the first sensor cell, and a second exterior side pump electrode disposed on an outer side of at least the second chamber of the second sensor cell may be provided in common.

[14] In the aspect of the present invention, the first target component measurement pump cell may include a first measurement electrode disposed inside the measurement chamber of the first sensor cell, and a first reference electrode disposed inside a reference gas introduction space of the sensor element, the second target component measurement pump cell may include a second measurement electrode disposed inside the measurement chamber of the second sensor cell, and a second reference electrode disposed inside the reference gas introduction space of the sensor element, and the first reference electrode and the second reference electrode may be provided in common.

[15] In the aspect of the present invention, instead of the first chamber of the second sensor cell, a diffusion resistance value of the first diffusion rate control portion of the second sensor cell may be substantially equivalent to a total value of the diffusion resistance values of the gas introduction port, the first diffusion rate control portion, the first chamber, and the second diffusion rate control portion, of the first sensor cell.

[16] In the aspect of the present invention, the first auxiliary adjustment chamber of the first sensor cell and the second auxiliary adjustment chamber of the second sensor cell may be omitted. In accordance with this feature, it is possible to add a unit that corrects the outputs of the first sensor cell and the second sensor cell due to changes in the oxygen concentration of the environment in which the present invention is used.

[17] In the aspect of the present invention, the first sensor cell and the second sensor cell may be disposed substantially symmetrically in a thickness direction of the sensor element.

In accordance with the gas sensor according to the present invention, it is possible to accurately measure over a prolonged time period the concentration of a non-combusted component such as exhaust gas, and a plurality of components (for example, NO, $NO_2$, and $NH_3$) that coexist in the presence of oxygen.

BRIEF DESCRIPTION OF DRAWINGS

FIG. 7 is an explanatory diagram showing the first map utilized by the first gas sensor in the form of a table;

FIG. 8 is an explanatory diagram showing measurement results in the form of a table in order to confirm the certainty of the first map;

DESCRIPTION OF EMBODIMENTS

Exemplary embodiments of a gas sensor according to the present invention will be presented and described below with reference to FIGS. 1 to 15. In the present specification, the term "to" when used to indicate a numerical range is used with the implication of including the numerical values written before and after the term as a lower limit value and an upper limit value of the numerical range.

Figure 1:
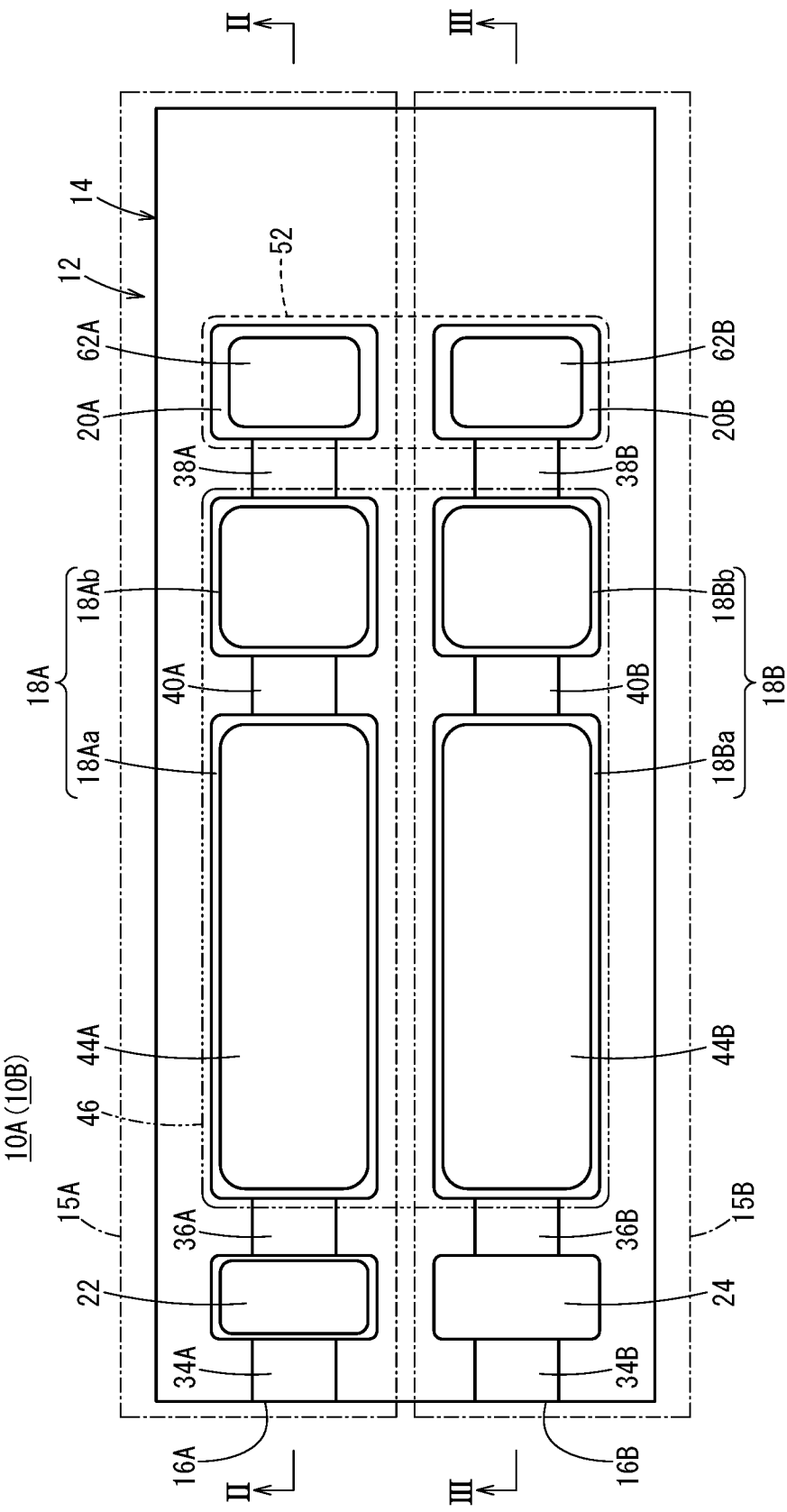
FIG. 1 is a cross-sectional view (a cross-sectional view taken along line I-I in FIG. 2: dashed lines omitted) showing a structural example of a gas sensor (first gas sensor) according to a first embodiment, and a gas sensor (second gas sensor) according to a second embodiment.
Figure 2:
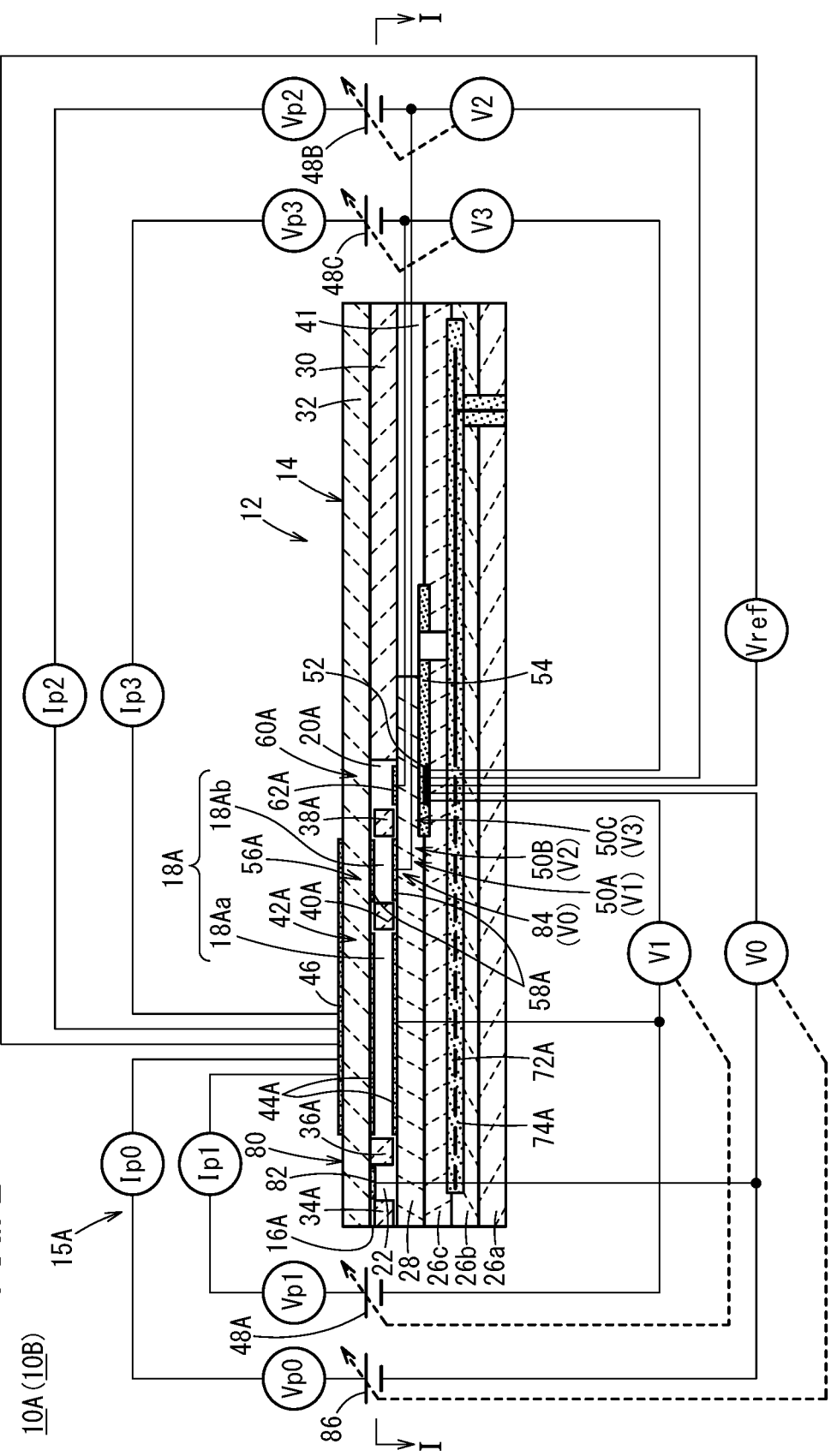
FIG. 2 is a cross-sectional view (a cross-sectional view taken along line II-II in FIG. 1) showing a structural example of a first sensor cell of the first gas sensor and the second gas sensor.
Figure 3:
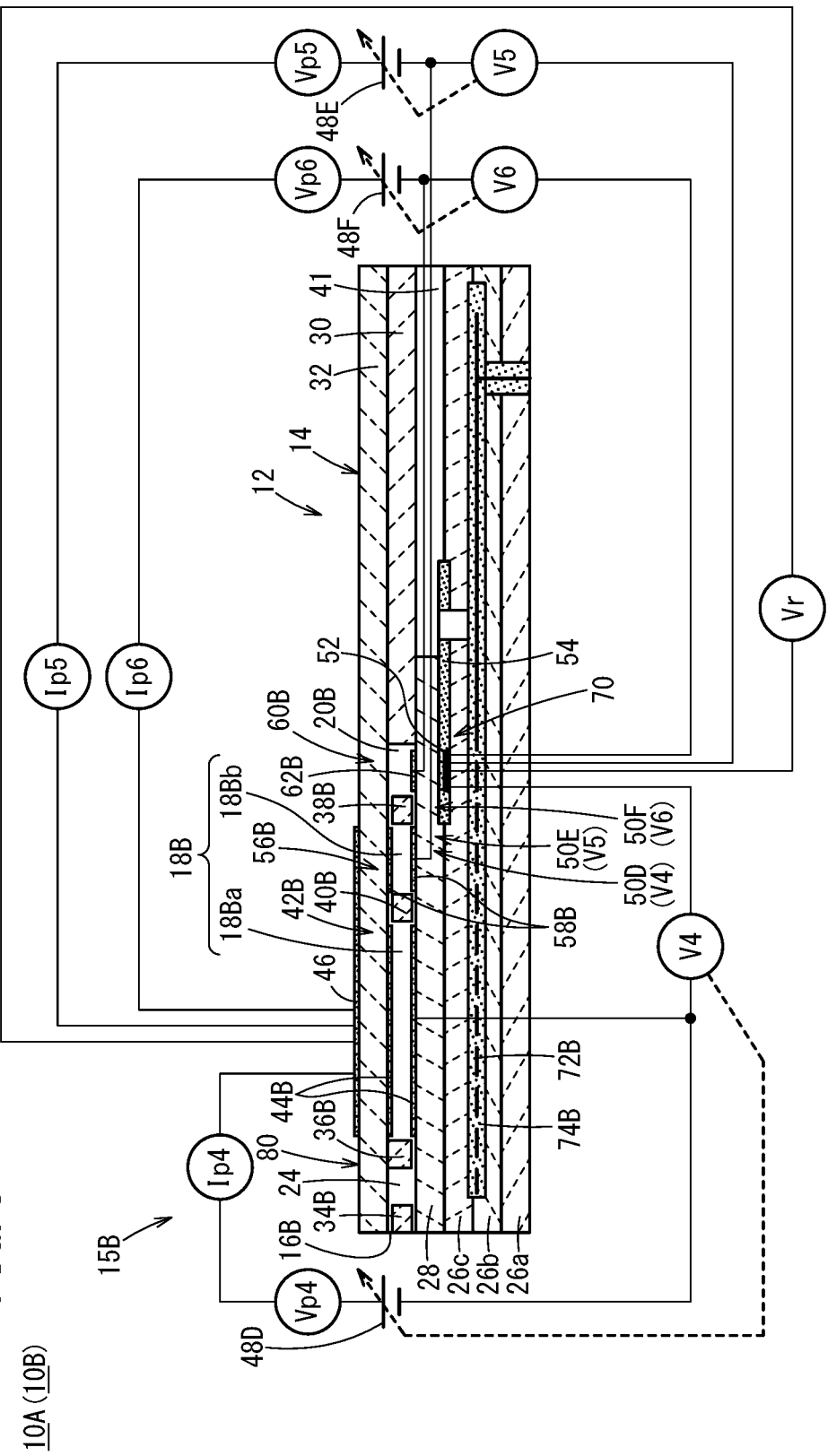
FIG. 3 is a cross-sectional view (a cross-sectional view taken along line III-III in FIG. 1) showing a structural example of a second sensor cell of the first gas sensor and the second gas sensor.

First, as shown in FIGS. 1 to 3, a gas sensor (hereinafter referred to as a first gas sensor 10A) according to a first embodiment includes a sensor element 12. The sensor element 12 includes a structural body 14 made up from an oxygen ion conductive solid electrolyte, and a first sensor cell 15A and a second sensor cell 15B formed in the structural body 14.

In this instance, when a thickness direction of the structural body 14 is defined as a vertical direction and a widthwise direction of the structural body 14 is defined as a horizontal direction, within the structural body 14, the first sensor cell 15A and the second sensor cell 15B are disposed in a state of being aligned in the horizontal direction.

As shown in FIG. 1, the first sensor cell 15A includes a first gas introduction port 16A formed in the structural body 14 and into which a gas to be measured is introduced, a first oxygen concentration adjustment chamber 18A formed inside the structural body 14 and communicating with the first gas introduction port 16A, and a first measurement chamber 20A formed inside the structural body 14 and communicating with the first oxygen concentration adjustment chamber 18A.

The first oxygen concentration adjustment chamber 18A includes a first main adjustment chamber 18Aa communicating with the first gas introduction port 16A, and a first auxiliary adjustment chamber 18Ab communicating with the first main adjustment chamber 18Aa. The first measurement chamber 20A communicates with the first auxiliary adjustment chamber 18Ab.

Furthermore, the first sensor cell 15A includes a preliminary adjustment chamber 22 provided between the first gas introduction port 16A and the first main adjustment chamber 18Aa within the structural body 14, and which communicates with the first gas introduction port 16A.

On the other hand, as shown in FIG. 3, the second sensor cell 15B includes a second gas introduction port 16B formed in the structural body 14 and into which a gas to be measured is introduced, a second oxygen concentration adjustment chamber 18B formed inside the structural body 14 and communicating with the second gas introduction port 16B, and a second measurement chamber 20B formed inside the structural body 14 and communicating with the second oxygen concentration adjustment chamber 18B.

The second oxygen concentration adjustment chamber 18B includes a second main adjustment chamber 18Ba in communication with the second gas introduction port 16B, and a second auxiliary adjustment chamber 18Bb in communication with the second main adjustment chamber 18Ba. The second measurement chamber 20B communicates with the second auxiliary adjustment chamber 18Bb.

Furthermore, the second sensor cell 15B includes a diffusion resistance adjustment chamber 24 (first chamber of the second sensor cell 15B) provided between the second gas introduction port 16B and the second main adjustment chamber 18Ba in the structural body 14, and which communicates with the second gas introduction port 16B.

More specifically, as shown in FIGS. 2 and 3, the structural body 14 is constituted by six layers including a first substrate layer 26a, a second substrate layer 26b, a third substrate layer 26c, a first solid electrolyte layer 28, a spacer layer 30, and a second solid electrolyte layer 32, which are stacked in this order from a lower side as viewed in the drawing. The respective layers are composed respectively of an oxygen ion conductive solid electrolyte layer such as zirconia ($ZrO_2$) or the like.

As shown in FIG. 2, in the first sensor cell 15A, between a lower surface of the second solid electrolyte layer 32 and an upper surface of the first solid electrolyte layer 28 on a distal end side of the sensor element 12, there are provided the first gas introduction port 16A, a first diffusion rate control portion 34A, the preliminary adjustment chamber 22, a second diffusion rate control portion 36A, the first oxygen concentration adjustment chamber 18A, a third diffusion rate control portion 38A, and the first measurement chamber 20A. Further, a fourth diffusion rate control portion 40A is provided between the first main adjustment chamber 18Aa and the first auxiliary adjustment chamber 18Ab that make up the first oxygen concentration adjustment chamber 18A.

The first gas introduction port 16A, the first diffusion rate control portion 34A, the preliminary adjustment chamber 22, the second diffusion rate control portion 36A, the first main adjustment chamber 18Aa, the fourth diffusion rate control portion 40A, the first auxiliary adjustment chamber 18Ab, the third diffusion rate control portion 38A, and the first measurement chamber 20A are formed adjacent to each other in a manner communicating in this order. A portion from the first gas introduction port 16A leading to the first measurement chamber 20A may also be referred to as a first gas flow section.

The first gas introduction port 16A, the preliminary adjustment chamber 22, the first main adjustment chamber 18Aa, the first auxiliary adjustment chamber 18Ab, and the first measurement chamber 20A are internal spaces provided by hollowing out the spacer layer 30. Any of the preliminary adjustment chamber 22, the first main adjustment chamber 18Aa, the first auxiliary adjustment chamber 18Ab, and the first measurement chamber 20A is arranged in a manner so that respective upper parts thereof are defined by a lower surface of the second solid electrolyte layer 32, respective lower parts thereof are defined by an upper surface of the first solid electrolyte layer 28, and respective side parts thereof are defined by side surfaces of the spacer layer 30.

Similarly, in relation to the second sensor cell 15B as well, as shown in FIG. 3, between a lower surface of the second solid electrolyte layer 32 and an upper surface of the first solid electrolyte layer 28 on a distal end side of the sensor element 12, there are provided the second gas introduction port 16B, a first diffusion rate control portion 34B, the diffusion resistance adjustment chamber 24, a second diffusion rate control portion 36B, the second oxygen concentration adjustment chamber 18B, a third diffusion rate control portion 38B, and the second measurement chamber 20B. Further, a fourth diffusion rate control portion 40B is provided between the second main adjustment chamber 18Ba and the second auxiliary adjustment chamber 18Bb that make up the second oxygen concentration adjustment chamber 18B.

The second gas introduction port 16B, the first diffusion rate control portion 34B, the diffusion resistance adjustment chamber 24, the second diffusion rate control portion 36B, the second main adjustment chamber 18Ba, the fourth diffusion rate control portion 40B, the second auxiliary adjustment chamber 18Bb, the third diffusion rate control portion 38B, and the second measurement chamber 20B are formed adjacent to each other in a manner communicating in this order. A portion from the second gas introduction port 16B leading to the second measurement chamber 20B may also be referred to as a second gas flow section.

The second gas introduction port 16B, the diffusion resistance adjustment chamber 24, the second main adjustment chamber 18Ba, the second auxiliary adjustment chamber 18Bb, and the second measurement chamber 20B are internal spaces provided by hollowing out the spacer layer 30. Any of the diffusion resistance adjustment chamber 24, the second main adjustment chamber 18Ba, the second auxiliary adjustment chamber 18Bb, and the second measurement chamber 20B is arranged in a manner so that respective upper parts thereof are defined by a lower surface of the second solid electrolyte layer 32, respective lower parts thereof are defined by an upper surface of the first solid electrolyte layer 28, and respective side parts thereof are defined by side surfaces of the spacer layer 30.

Together with the first sensor cell 15A and the second sensor cell 15B, any of the first diffusion rate control portions (34A and 34B), the third diffusion rate control portions (38A and 38B), and the fourth diffusion rate control portions (40A and 40B) is provided as two horizontally elongated slits (in which openings thereof have a longitudinal direction in a direction perpendicular to the drawing). Each of the second diffusion rate control portions (36A and 36B) is provided as one horizontally elongated slit (in which an opening thereof has a longitudinal direction in a direction perpendicular to the drawing).

Further, a reference gas introduction space 41, which is common to the first sensor cell 15A and the second sensor cell 15B, is disposed between the upper surface of the third substrate layer 26c and the lower surface of the spacer layer 30, at a position that is farther from the distal end side than the first gas flow section and the second gas flow section, respectively. The reference gas introduction space 41 is an internal space in which an upper part thereof is defined by a lower surface of the spacer layer 30, a lower part thereof is defined by an upper surface of the third substrate layer 26c, and side parts thereof are defined by side surfaces of the first solid electrolyte layer 28. For example, oxygen or atmospheric air is introduced as a reference gas into the reference gas introduction space 41.

The first gas introduction port 16A and the second gas introduction port 16B are locations that open with respect to the external space, and the gas to be measured is drawn into the first sensor cell 15A and the second sensor cell 15B from the external space through the first gas introduction port 16A and the second gas introduction port 16B.

The first diffusion rate control portion 34A of the first sensor cell 15A is a location that imparts a predetermined diffusion resistance to the gas to be measured which is introduced from the first gas introduction port 16A into the preliminary adjustment chamber 22. Details concerning the preliminary adjustment chamber 22 will be described later. The first diffusion rate control portion 34B of the second sensor cell 15B is a location that imparts a predetermined diffusion resistance to the gas to be measured which is introduced from the second gas introduction port 16B into the diffusion resistance adjustment chamber 24.

The second diffusion rate control portion 36A of the first sensor cell 15A is a location that imparts a predetermined diffusion resistance to the gas to be measured which is introduced from the preliminary adjustment chamber 22 into the first main adjustment chamber 18Aa. The second diffusion rate control portion 36B of the second sensor cell 15B is a location that imparts a predetermined diffusion resistance to the gas to be measured which is introduced from the diffusion resistance adjustment chamber 24 into the second main adjustment chamber 18Ba.

The first main adjustment chamber 18Aa is provided as a space for the purpose of adjusting an oxygen partial pressure within the gas to be measured that is introduced from the first gas introduction port 16A. The oxygen partial pressure is adjusted by operation of a first main pump cell 42A. The second main adjustment chamber 18Ba is provided as a space for the purpose of adjusting an oxygen partial pressure within the gas to be measured that is introduced from the second gas introduction port 16B. The oxygen partial pressure is adjusted by operation of a second main pump cell 42B.

The first main pump cell 42A comprises a first electrochemical pump cell (main electrochemical pumping cell), which is constituted by including a first main interior side pump electrode 44A, an exterior side pump electrode 46 which is common to the first sensor cell 15A and the second sensor cell 15B, and an oxygen ion conductive solid electrolyte which is sandwiched between the two pump electrodes. The first main interior side pump electrode 44A is provided substantially over the entire surface, respectively, of an upper surface of the first solid electrolyte layer 28, a lower surface of the second solid electrolyte layer 32, and side surfaces of the spacer layer 30 that define the first main adjustment chamber 18Aa. The common exterior side pump electrode 46 extends, on the upper surface of the second solid electrolyte layer 32, from a region corresponding to the first main interior side pump electrode 44A to a region corresponding to a second main interior side pump electrode 44B (the second sensor cell 15B), and is provided in a form of being exposed to the external space.

The first main pump cell 42A applies a first pump voltage Vp1 supplied from a first variable power source 48A for the first sensor cell which is provided externally of the sensor element 12, and by allowing a first pump current Ip1 to flow between the common exterior side pump electrode 46 and the first main interior side pump electrode 44A, it is possible to pump oxygen in the interior of the first main adjustment chamber 18Aa into the external space, or alternatively, to pump oxygen in the external space into the first main adjustment chamber 18Aa.

Further, the first sensor cell 15A includes a first oxygen partial pressure detecting sensor cell 50A which is an electrochemical sensor cell. The first oxygen partial pressure detecting sensor cell 50A is constituted by the first main interior side pump electrode 44A, a common reference electrode 52 sandwiched between the first solid electrolyte layer 28 and an upper surface of the third substrate layer 26c, and an oxygen ion conductive solid electrolyte sandwiched between these electrodes. The common reference electrode 52 is an electrode having a substantially rectangular shape as viewed in plan, which is made from a porous cermet in the same manner as the common exterior side pump electrode 46 and the like. Further, around the periphery of the common reference electrode 52, a common reference gas introduction layer 54 is provided, which is made from porous alumina and is connected to the common reference gas introduction space 41. More specifically, the reference gas in the reference gas introduction space 41 is introduced to the surface of the reference electrode 52 via the reference gas introduction layer 54. The first oxygen partial pressure detecting sensor cell 50A generates a first electromotive force V1 between the first main interior side pump electrode 44A and the reference electrode 52, which is caused by the difference in oxygen concentration between the atmosphere inside the first main adjustment chamber 18Aa and the reference gas in the reference gas introduction space 41.

The first electromotive force V1 generated in the first oxygen partial pressure detecting sensor cell 50A changes depending on the oxygen partial pressure of the atmosphere existing in the first main adjustment chamber 18Aa. In accordance with the aforementioned first electromotive force V1, the first sensor cell 15A feedback-controls the first variable power source 48A of the first main pump cell 42A. Consequently, the first pump voltage Vp1, which is applied by the first variable power source 48A to the first main pump cell 42A, can be controlled in accordance with the oxygen partial pressure of the atmosphere in the first main adjustment chamber 18Aa.

The fourth diffusion rate control portion 40A imparts a predetermined diffusion resistance to the gas to be measured, the oxygen concentration (oxygen partial pressure) of which is controlled by operation of the first main pump cell 42A in the first main adjustment chamber 18Aa, and is a location that guides the gas to be measured into the first auxiliary adjustment chamber 18Ab.

The first auxiliary adjustment chamber 18Ab is provided as a space for further carrying out adjustment of the oxygen partial pressure by a first auxiliary pump cell 56A, with respect to the gas to be measured which is introduced through the fourth diffusion rate control portion 40A, after the oxygen concentration (oxygen partial pressure) has been adjusted beforehand in the first main adjustment chamber 18Aa. In accordance with this feature, the oxygen concentration inside the first auxiliary adjustment chamber 18Ab can be kept constant with high accuracy, and therefore, the first sensor cell 15A is made capable of measuring the NOx concentration with high accuracy.

The first auxiliary pump cell 56A is an electrochemical pump cell, and is constituted by a first auxiliary pump electrode 58A, which is provided substantially over the entirety of the lower surface of the second solid electrolyte layer 32 facing toward the first auxiliary adjustment chamber 18Ab, the common exterior side pump electrode 46, and the second solid electrolyte layer 32.

Moreover, in the same manner as the first main interior side pump electrode 44A, the first auxiliary pump electrode 58A is also formed using a material that weakens the reduction capability with respect to the NOx component within the gas to be measured.

The first auxiliary pump cell 56A, by applying a desired second voltage $Vp2$ between the first auxiliary pump electrode 58A and the exterior side pump electrode 46, is capable of pumping out oxygen within the atmosphere inside the first auxiliary adjustment chamber 18Ab into the external space, or alternatively, is capable of pumping in oxygen from the external space into the first auxiliary adjustment chamber 18Ab.

Further, in order to control the oxygen partial pressure within the atmosphere inside the first auxiliary adjustment chamber 18Ab, an electrochemical sensor cell, and more specifically, a second oxygen partial pressure detecting sensor cell 50B for controlling the first auxiliary pump, is constituted by the first auxiliary pump electrode 58A, the reference electrode 52, the second solid electrolyte layer 32, the spacer layer 30, and the first solid electrolyte layer 28.

Moreover, the first auxiliary pump cell 56A carries out pumping by a second variable power source 48B, the voltage of which is controlled based on a second electromotive force $V2$ detected by the second oxygen partial pressure detecting sensor cell 50B. Consequently, the oxygen partial pressure within the atmosphere inside the first auxiliary adjustment chamber 18Ab is controlled so as to become a low partial pressure that does not substantially influence the measurement of NOx.

Further, together therewith, a second pump current $Ip2$ of the first auxiliary pump cell 56A is used so as to control the second electromotive force $V2$ of the second oxygen partial pressure detecting sensor cell 50B. More specifically, the second pump current $Ip2$ is input as a control signal to the second oxygen partial pressure detecting sensor cell 50B, and by controlling the second electromotive force $V2$, the gradient of the oxygen partial pressure within the gas to be measured, which is introduced through the fourth diffusion rate control portion 40A into the first auxiliary adjustment chamber 18Ab, is controlled so as to remain constant at all times. Furthermore, if the first variable power source 48A of the first main pump cell 42A is feedback-controlled in a manner so that the second pump current value $Ip2$ becomes constant, the accuracy of the oxygen partial pressure control within the first auxiliary adjustment chamber 18Ab is further improved. When the first sensor cell 15A is used as a NOx sensor, by the actions of the first main pump cell 42A and the first auxiliary pump cell 56A, the oxygen concentration inside the first auxiliary adjustment chamber 18Ab is maintained at a predetermined value with high accuracy for each of the respective conditions.

The third diffusion rate control portion 38A imparts a predetermined diffusion resistance to the gas to be measured, the oxygen concentration (oxygen partial pressure) of which is controlled by operation of the first auxiliary pump cell 56A in the first auxiliary adjustment chamber 18Ab, and is a location that guides the gas to be measured into the first measurement chamber 20A.

In the first sensor cell 15A, measurement of the NOx concentration is primarily performed by operations of a first measurement pump cell 60A provided in the first measurement chamber 20A. The first measurement pump cell 60A is an electrochemical pump cell constituted by a first measurement electrode 62A, the common exterior side pump electrode 46, the second solid electrolyte layer 32, the spacer layer 30, and the first solid electrolyte layer 28. The first measurement electrode 62A is provided, for example, directly on the upper surface of the first solid electrolyte layer 28 inside the first measurement chamber 20A, and is a porous cermet electrode made of a material whose reduction capability with respect to the NOx component within the gas to be measured is higher than that of the first main interior side pump electrode 44A. The first measurement electrode 62A also functions as a NOx reduction catalyst for reducing NOx existing within the atmosphere above the first measurement electrode 62A.

The first measurement pump cell 60A is capable of pumping out oxygen that is generated by the decomposition of nitrogen oxide within the atmosphere around the periphery of the first measurement electrode 62A (inside the first measurement chamber 20A), and can detect the generated amount as a third pump current value $Ip3$, and more specifically, as a sensor output (a first measurement pump current value $Ip3$) of the first sensor cell 15A.

Further, in order to detect the oxygen partial pressure around the periphery of the first measurement electrode 62A (inside the first measurement chamber 20A), an electrochemical sensor cell, and more specifically, a third oxygen partial pressure detecting sensor cell 50C for controlling the measurement pump, is constituted by the first solid electrolyte layer 28, the first measurement electrode 62A, and the reference electrode 52. A third variable power source 48C is controlled based on a third electromotive force $V3$ detected by the third oxygen partial pressure detecting sensor cell 50C.

The gas to be measured, which is introduced into the first auxiliary adjustment chamber 18Ab, reaches the first measurement electrode 62A inside the first measurement chamber 20A through the third diffusion rate control portion 38A, under a condition in which the oxygen partial pressure is controlled. Nitrogen oxide existing within the gas to be measured around the periphery of the first measurement electrode 62A is reduced to thereby generate oxygen. Then, the generated oxygen is subjected to pumping by the first measurement pump cell 60A. At this time, a third voltage $Vp3$ of the third variable power source 48C is controlled in a manner so that the third electromotive force $V3$ detected by the third oxygen partial pressure detecting sensor cell 50C becomes constant. The amount of oxygen generated around the periphery of the first measurement electrode 62A is proportional to the concentration of nitrogen oxide within the gas to be measured. Accordingly, the nitrogen oxide concentration within the gas to be measured can be calculated using the first measurement pump current value $Ip3$ of the first measurement pump cell 60A. More specifically, the first measurement pump cell 60A measures the concentration of a specified component (NO) within the first measurement chamber 20A.

Furthermore, in the first sensor cell 15A, a first heater 72A is formed in a manner of being sandwiched from above and below between the second substrate layer 26b and the third substrate layer 26c. The first heater 72A generates heat by being supplied with power from the exterior through a non-illustrated heater electrode provided on a lower surface of the first substrate layer 26a. As a result of the heat generated by the first heater 72A, the oxygen ion conductivity of the solid electrolyte that constitutes the first sensor cell 15A is enhanced. The first heater 72A is embedded over the entire region of the preliminary adjustment chamber 22, the first oxygen concentration adjustment chamber 18A, and the first measurement chamber 20A, and a predetermined location of the first sensor cell 15A can be heated and maintained at a predetermined temperature. Moreover, a first heater insulating layer 74A made of alumina or the like is formed on the upper and lower surfaces of the first heater 72A, for the purpose of obtaining electrical insulation thereof from the second substrate layer 26b and the third substrate layer 26c.

The preliminary adjustment chamber 22 is provided as a space for the purpose of adjusting an oxygen partial pressure within the gas to be measured that is introduced from the first gas introduction port 16A. The oxygen partial pressure is adjusted by operation of a later-described preliminary pump cell 80.

The preliminary pump cell 80 is a preliminary electrochemical pump cell, and is constituted by a preliminary pump electrode 82, which is provided substantially over the entirety of the lower surface of the second solid electrolyte layer 32 facing toward the preliminary adjustment chamber 22, the exterior side pump electrode 46, and the second solid electrolyte layer 32.

Moreover, in the same manner as the first main interior side pump electrode 44A, the preliminary pump electrode 82 is also formed using a material that weakens the reduction capability with respect to the NOx component within the gas to be measured.

The preliminary pump cell 80, by applying a desired preliminary voltage Vp0 between the preliminary pump electrode 82 and the exterior side pump electrode 46, is capable of pumping out oxygen within the atmosphere inside the preliminary adjustment chamber 22 into the external space, or alternatively, is capable of pumping in oxygen from the external space into the preliminary adjustment chamber 22.

Further, the first sensor cell 15A includes a preliminary oxygen partial pressure detecting sensor cell 84 for controlling the preliminary pump, in order to control the oxygen partial pressure within the atmosphere inside the preliminary adjustment chamber 22. The preliminary oxygen partial pressure detecting sensor cell 84 includes the preliminary pump electrode 82, the reference electrode 52, the second solid electrolyte layer 32, the spacer layer 30, and the first solid electrolyte layer 28.

Moreover, the preliminary pump cell 80 carries out pumping by a preliminary variable power source 86, the voltage of which is controlled based on a preliminary electromotive force V0 detected by the preliminary oxygen partial pressure detecting sensor cell 84. Consequently, the oxygen partial pressure within the atmosphere inside the preliminary adjustment chamber 22 is controlled so as to become a low partial pressure that does not substantially influence the measurement of NOx.

Further, together therewith, a preliminary pump current value Ip0 thereof is used so as to control the electromotive force of the preliminary oxygen partial pressure detecting sensor cell 84. More specifically, the preliminary pump current Ip0 is input as a control signal to the preliminary oxygen partial pressure detecting sensor cell 84, and by controlling the preliminary electromotive force V0, the gradient of the oxygen partial pressure within the gas to be measured, which is introduced from the first diffusion rate control portion 34A into the preliminary adjustment chamber 22, is controlled so as to remain constant at all times.

The preliminary adjustment chamber 22 also functions as a buffer space. More specifically, it is possible to cancel fluctuations in the concentration of the gas to be measured, which are caused by pressure fluctuations of the gas to be measured in the external space (pulsations in the exhaust pressure, in the case that the gas to be measured is an exhaust gas of an automotive vehicle).

On the other hand, as shown in FIG. 3, the second sensor cell 15B includes the second main pump cell 42B, a second auxiliary pump cell 56B, the fourth oxygen partial pressure detecting sensor cell 50D, a fifth oxygen partial pressure detecting sensor cell 50E, and a sixth oxygen partial pressure detecting sensor cell 50F.

The second main pump cell 42B, in the same manner as the first main pump cell 42A, comprises a second electrochemical pump cell (main electrochemical pumping cell), which is constituted by including the second main interior side pump electrode 44B, the common exterior side pump electrode 46, and an oxygen ion conductive solid electrolyte which is sandwiched between the two pump electrodes.

By applying a fourth pump voltage Vp4 supplied from a fourth variable power source 48D for the second sensor cell, and by allowing a fourth pump current Ip4 to flow between the common exterior side pump electrode 46 and the second main interior side pump electrode 44B, it is possible to pump oxygen in the interior of the second main adjustment chamber 18Ba into the external space, or alternatively, to pump oxygen in the external space into the second main adjustment chamber 18Ba.

The second auxiliary pump cell 56B is an electrochemical pump cell, and in the same manner as the aforementioned first auxiliary pump cell 56A, is constituted by a second auxiliary pump electrode 58B, which is provided substantially over the entirety of the lower surface of the second solid electrolyte layer 32 facing toward the second auxiliary adjustment chamber 18Bb, the common exterior side pump electrode 46, and the second solid electrolyte layer 32.

The second auxiliary pump cell 56B, by applying a desired fifth voltage Vp5 between the second auxiliary pump electrode 58B and the exterior side pump electrode 46, is capable of pumping out oxygen within the atmosphere inside the second auxiliary adjustment chamber 18Bb into the external space, or alternatively, is capable of pumping in oxygen from the external space into the second auxiliary adjustment chamber 18Bb.

The fourth oxygen partial pressure detecting sensor cell 50D, in the same manner as the first oxygen partial pressure detecting sensor cell 50A, is constituted by the second main interior side pump electrode 44B, the common reference electrode 52 sandwiched between the first solid electrolyte layer 28 and an upper surface of the third substrate layer 26c, and an oxygen ion conductive solid electrolyte sandwiched between these electrodes.

The fourth oxygen partial pressure detecting sensor cell 50D generates a fourth electromotive force V4 between the second main interior side pump electrode 44B and the reference electrode 52, which is caused by the difference in oxygen concentration between the atmosphere inside the second main adjustment chamber 18Ba and the reference gas in the reference gas introduction space 41.

The fourth electromotive force V4 generated in the fourth oxygen partial pressure detecting sensor cell 50D changes depending on the oxygen partial pressure of the atmosphere existing in the second main adjustment chamber 18Ba. In accordance with the aforementioned fourth electromotive force V4, the second sensor cell 15B feedback-controls the fourth variable power source 48D of the second main pump cell 42B. Consequently, the fourth pump voltage Vp4, which is applied by the fourth variable power source 48D to the second main pump cell 42B, can be controlled in accordance with the oxygen partial pressure of the atmosphere in the second main adjustment chamber 18Ba.

Further, in order to control the oxygen partial pressure within the atmosphere inside the second auxiliary adjustment chamber 18Bb, an electrochemical sensor cell, and more specifically, a fifth oxygen partial pressure detecting sensor cell 50E for controlling the second auxiliary pump, is constituted by the second auxiliary pump electrode 58B, the reference electrode 52, the second solid electrolyte layer 32, the spacer layer 30, and the first solid electrolyte layer 28.

The second auxiliary pump cell 56B carries out pumping by a fifth variable power source 48E, the voltage of which is controlled based on a fifth electromotive force V5 detected by the fifth oxygen partial pressure detecting sensor cell 50E. Consequently, the oxygen partial pressure within the atmosphere inside the second auxiliary adjustment chamber 18Bb is controlled so as to become a low partial pressure that does not substantially influence the measurement of NOx.

Further, together therewith, a fifth pump current value Ip5 of the second auxiliary pump cell 56B is used so as to control the fifth electromotive force V5 of the fifth oxygen partial pressure detecting sensor cell 50E. Stated otherwise, the gradient of the oxygen partial pressure within the gas to be measured, which is introduced into the second auxiliary adjustment chamber 18Bb, is controlled so as to remain constant at all times.

Further, in order to detect the oxygen partial pressure around the periphery of the second measurement electrode 62B (inside the second measurement chamber 20B), an electrochemical sensor cell, and more specifically, a sixth oxygen partial pressure detecting sensor cell 50F for controlling the measurement pump, is constituted by the first solid electrolyte layer 28, the second measurement electrode 62B, and the reference electrode 52. The sixth variable power source 48F is controlled based on a sixth electromotive force V6 detected by the sixth oxygen partial pressure detecting sensor cell 50F.

The gas to be measured, which is introduced into the second auxiliary adjustment chamber 18Bb, reaches the second measurement electrode 62B inside the second measurement chamber 20B through the third diffusion rate control portion 38B, under a condition in which the oxygen partial pressure is controlled. Nitrogen oxide existing within the gas to be measured around the periphery of the second measurement electrode 62B is reduced to thereby generate oxygen. Then, the generated oxygen is subjected to pumping by the second measurement pump cell 60B. At this time, a sixth voltage Vp6 of the sixth variable power source 48F is controlled in a manner so that the sixth electromotive force V6 detected by the sixth oxygen partial pressure detecting sensor cell 50F becomes constant. The amount of oxygen generated around the periphery of the second measurement electrode 62B is proportional to the concentration of nitrogen oxide within the gas to be measured. Accordingly, the nitrogen oxide concentration within the gas to be measured can be calculated using the second measurement pump current value Ip6 of the second measurement pump cell 60B. More specifically, the second measurement pump cell 60B measures the concentration of a specified component (NO) within the second measurement chamber 20B.

Further, the second sensor cell 15B includes an electrochemical oxygen detecting cell 70. The oxygen detecting cell 70 includes the second solid electrolyte layer 32, the spacer layer 30, the first solid electrolyte layer 28, the third substrate layer 26c, the exterior side pump electrode 46, and the reference electrode 52. In accordance with the electromotive force Vr obtained by the oxygen detecting cell 70, it is possible to detect the oxygen partial pressure within the gas to be measured existing externally of the sensor element 12.

Further, in the second sensor cell 15B, a second heater 72B is formed similarly to the aforementioned first heater 72A, in a manner of being sandwiched from above and below between the second substrate layer 26b and the third substrate layer 26c. The second heater 72B is embedded over the entire region of the diffusion resistance adjustment chamber 24, the second oxygen concentration adjustment chamber 18B, and the second measurement chamber 20B, and a predetermined location of the second sensor cell 15B can be heated and maintained at a predetermined temperature. Moreover, a second heater insulating layer 74B made of alumina or the like is formed on the upper and lower surfaces of the second heater 72B, for the purpose of obtaining electrical insulation thereof from the second substrate layer 26b and the third substrate layer 26c. The first heater 72A and the second heater 72B may be configured by one common heater, and in such a case, the first heater insulating layer 74A and the second heater insulating layer 74B are also provided in common.

The diffusion resistance adjustment chamber 24 also functions as a buffer space. More specifically, it is possible to cancel fluctuations in the concentration of the gas to be measured, which are caused by pressure fluctuations of the gas to be measured in the external space (pulsations in the exhaust pressure, in the case that the gas to be measured is an exhaust gas of an automotive vehicle).

Figure 4:
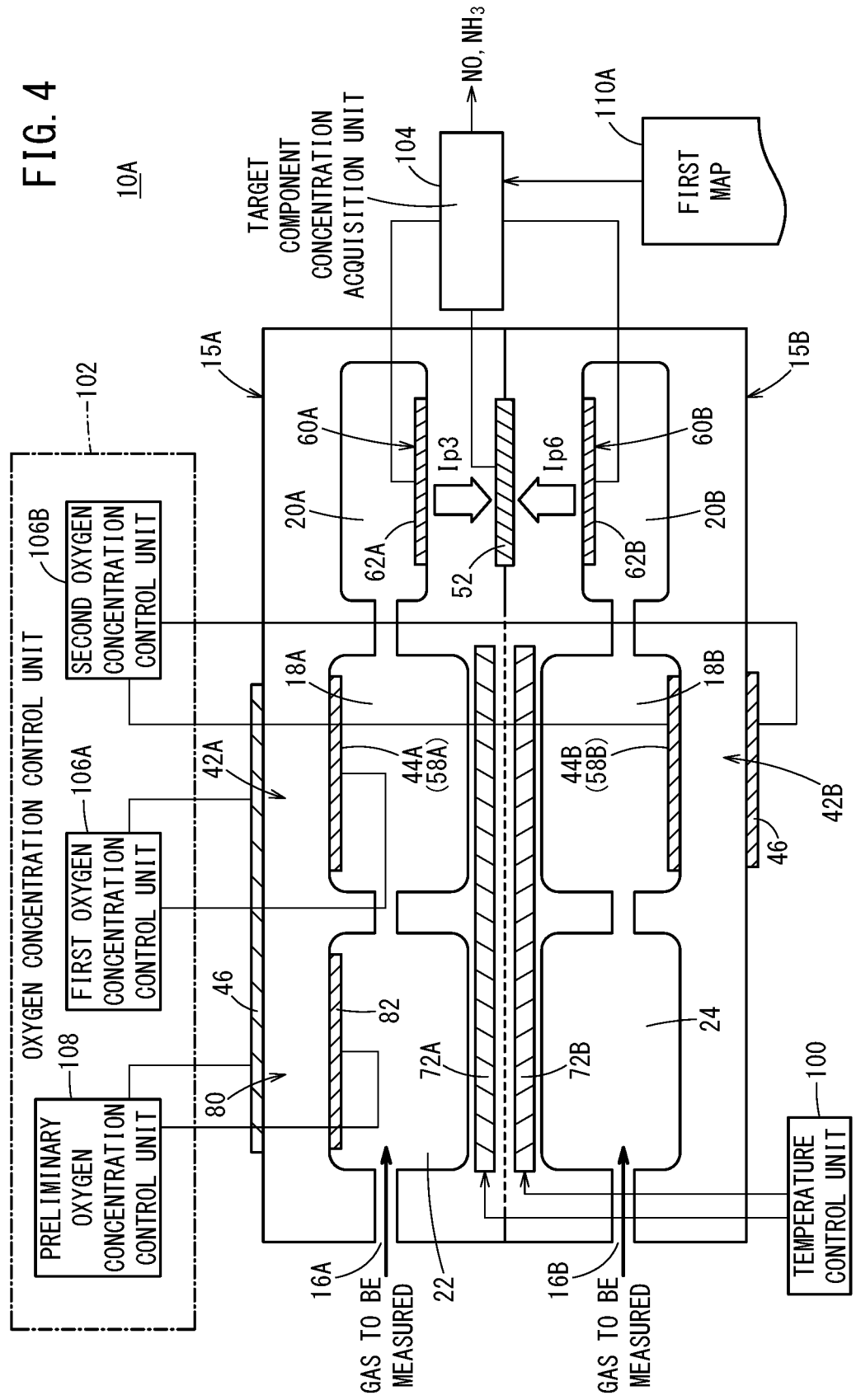
FIG. 4 is a configuration diagram schematically showing the first gas sensor.

Furthermore, as shown schematically in FIG. 4, the first gas sensor 10A includes a temperature control unit 100, an oxygen concentration control unit 102, and a target component concentration acquisition unit 104.

The temperature control unit 100 controls the supply of current to the first heater 72A and the second heater 72B of the sensor element 12, and thereby controls the temperature of the first sensor cell 15A and the second sensor cell 15B.

The oxygen concentration control unit 102 includes a first oxygen concentration control unit 106A that controls the oxygen concentration inside the first oxygen concentration adjustment chamber 18A of the first sensor cell 15A, a second oxygen concentration control unit 106B that controls the oxygen concentration inside the second oxygen concentration adjustment chamber 18B of the second sensor cell 15B, and a preliminary oxygen concentration control unit 108 that controls the oxygen concentration inside the preliminary adjustment chamber 22 of the first sensor cell 15A.

The target component concentration acquisition unit 104 acquires the concentrations of the first target component (NO) and the second target component ($NH_3$), on the basis of the difference (amount of change ΔIp) between the first measurement pump current value Ip3 flowing to the first measurement pump cell 60A of the first sensor cell 15A and the second measurement pump current value Ip6 flowing to the second measurement pump cell 60B of the second sensor cell 15B, the second measurement pump current value Ip6 (total concentration), and a later-described first map 110A.

Moreover, the temperature control unit 100, the oxygen concentration control unit 102, and the target component concentration acquisition unit 104 are constituted by one or more electronic circuits having, for example, one or a plurality of CPUs (central processing units), memory devices, and the like. The electronic circuits are software-based functional units in which predetermined functions are realized, for example, by the CPUs executing programs stored in a storage device. Of course, the electronic circuits may be constituted by an integrated circuit such as an FPGA (Field-Programmable Gate Array), in which the plurality of electronic circuits are connected according to the functions thereof.

With the NOx sensor possessed by a conventional serially arranged two-chamber type structure, with respect to the target components of NO and $NH_3$, after the totality thereof has been converted into NO inside the oxygen concentration adjustment chamber, the converted components are introduced into the measurement chamber, and then the total amount of these two components is measured. Stated otherwise, it has been impossible to measure the concentrations of each of the two target components, that is, the respective concentrations of NO and $NH_3$.

In contrast thereto, the first gas sensor 10A is provided with the aforementioned first sensor cell 15A, the second sensor cell 15B, the temperature control unit 100, the oxygen concentration control unit 102, and the target component concentration acquisition unit 104, whereby the respective concentrations of NO and $NH_3$ can be obtained.

The temperature control unit 100 feedback-controls the first heater 72A and the second heater 72B on the basis of preset sensor temperature conditions, and the measured value from a temperature sensor (not shown) that measures the temperature of the sensor element 12, whereby the temperature of the sensor element 12 is adjusted to a temperature in accordance with the above-described condition.

On the basis of the preset oxygen concentration condition inside the first oxygen concentration adjustment chamber 18A, and the first electromotive force V1 generated in the first oxygen partial pressure detecting sensor cell 50A (see FIG. 2), the first oxygen concentration control unit 106A of the oxygen concentration control unit 102 feedback-controls the first variable power source 48A, thereby adjusting the oxygen concentration inside the first oxygen concentration adjustment chamber 18A to a concentration in accordance with the above-described condition.

On the basis of the preset oxygen concentration condition inside the second oxygen concentration adjustment chamber 18B, and the fourth electromotive force V4 generated in the fourth oxygen partial pressure detecting sensor cell 50D (see FIG. 3), the second oxygen concentration control unit 106B of the oxygen concentration control unit 102 feedback-controls the fourth variable power source 48D, thereby adjusting the oxygen concentration inside the second oxygen concentration adjustment chamber 18B to a concentration in accordance with the above-described condition.

By the oxygen concentration control unit 102 or the temperature control unit 100, or alternatively, by the oxygen concentration control unit 102 and the temperature control unit 100, the first gas sensor 10A performs a control so as to convert the $NH_3$ into NO at a ratio capable of being used for measurement of $NH_3$, without causing decomposition of NO inside the first oxygen concentration adjustment chamber 18A and the second oxygen concentration adjustment chamber 18B.

On the basis of the preset oxygen concentration condition, and the preliminary electromotive force V0 generated in the preliminary oxygen partial pressure detecting sensor cell 84 (see FIG. 2), the preliminary oxygen concentration control unit 108 of the oxygen concentration control unit 102 feedback-controls the preliminary variable power source 86, thereby adjusting the oxygen concentration inside the preliminary adjustment chamber 22 to a concentration in accordance with the condition. By the preliminary oxygen concentration control unit 108, $NH_3$ is converted into NO at a ratio capable of being used for measurement of $NH_3$, without causing decomposition of NO inside the preliminary adjustment chamber 22 in the first sensor cell 15A.

Next, processing operations of the first gas sensor 10A will be described with reference also to FIG. 5.

Figure 5:
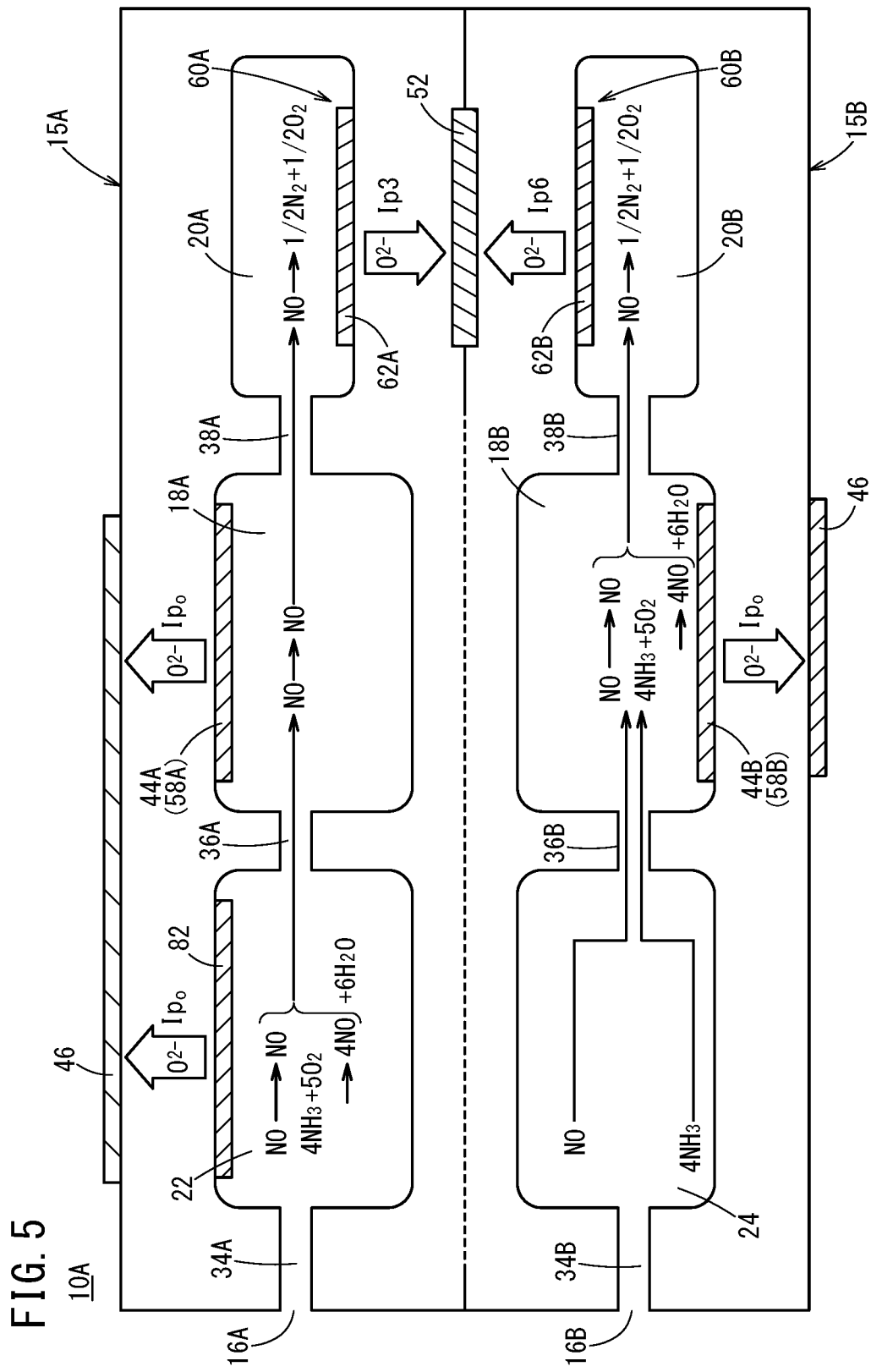
FIG. 5 is an explanatory diagram schematically showing reactions inside a preliminary adjustment chamber, inside a first oxygen concentration adjustment chamber, and inside a first measurement chamber of a first sensor cell in a first gas sensor, as well as reactions inside a diffusion resistance adjustment chamber, inside a second oxygen concentration adjustment chamber, and inside a second measurement chamber of a second sensor cell in the first gas sensor.

First, in the first sensor cell 15A, as shown in FIG. 5, the $NH_3$ introduced into the preliminary adjustment chamber 22 through the first gas introduction port 16A is subjected to an oxidation reaction of $NH_3 \rightarrow NO$ inside the preliminary adjustment chamber 22, whereupon all of the $NH_3$ introduced through the first gas introduction port 16A is converted into NO. Accordingly, although the $NH_3$ passes through the first diffusion rate control portion 34A at the $NH_3$ diffusion coefficient of 2.2 $cm^2$/sec, after having passed through the second diffusion rate control portion 36A, which is positioned on the back side of the preliminary adjustment chamber 22, movement into the first measurement chamber 20A occurs at the NO diffusion coefficient of 1.8 $cm^2$/sec.

On the other hand, in the second sensor cell 15B, the $NH_3$ that was introduced through the second gas introduction port 16B reaches the second oxygen concentration adjustment chamber 18B. In the second oxygen concentration adjustment chamber 18B, by operation of the oxygen concentration control unit 102 (see FIG. 4), a control is performed so as to convert all of the $NH_3$ into NO, and therefore, the $NH_3$ that has flowed into the second oxygen concentration adjustment chamber 18B causes an oxidation reaction of $NH_3 \rightarrow NO$ to occur inside the second oxygen concentration adjustment chamber 18B, and all of the $NH_3$ inside the second oxygen concentration adjustment chamber 18B is converted into NO. Accordingly, the $NH_3$ that was introduced through the second gas introduction port 16B passes through the first diffusion rate control portion 34B and the second diffusion rate control portion 36B at the $NH_3$ diffusion coefficient of 2.2 $cm^2$/sec, and after being converted into NO inside the second oxygen concentration adjustment chamber 18B, passes through the third diffusion rate control portion 38B at the NO diffusion coefficient of 1.8 $cm^2$/sec, and moves into the adjacent second measurement chamber 20B.

More specifically, in the first sensor cell 15A, the location where the oxidation reaction of $NH_3$ takes place is the preliminary adjustment chamber 22, and in the second sensor cell 15B, the location where the oxidation reaction of $NH_3$ takes place is the second oxygen concentration adjustment chamber 18B. Since NO and $NH_3$ each possess different diffusion coefficients, the difference between passing through the second diffusion rate control portions (36A and 36B) with NO and passing therethrough with $NH_3$ corresponds to a difference in the amount of NO that flows into the first measurement chamber 20A and the second measurement chamber 20B. Such a feature brings about a difference between the first measurement pump current value Ip3 of the first measurement pump cell 60A, and the second measurement pump current value Ip6 of the second measurement pump cell 60B. However, significantly, the second measurement pump current value Ip6 of the second measurement pump cell 60B corresponds to the total value of the $NH_3$ concentration and the NO concentration within the measurement gas.

Additionally, the amount of change ΔIp between the first measurement pump current value Ip3 and the second measurement pump current value Ip6 changes according to the $NH_3$ concentration within the gas to be measured. Therefore, the concentrations of NO and $NH_3$ can be obtained from the second measurement pump current value Ip6 (the total concentration of NO and $NH_3$) that flows to the second measurement pump cell 60B, and the aforementioned amount of change $\Delta Ip$ (the $NH_3$ concentration).

Figure 6:
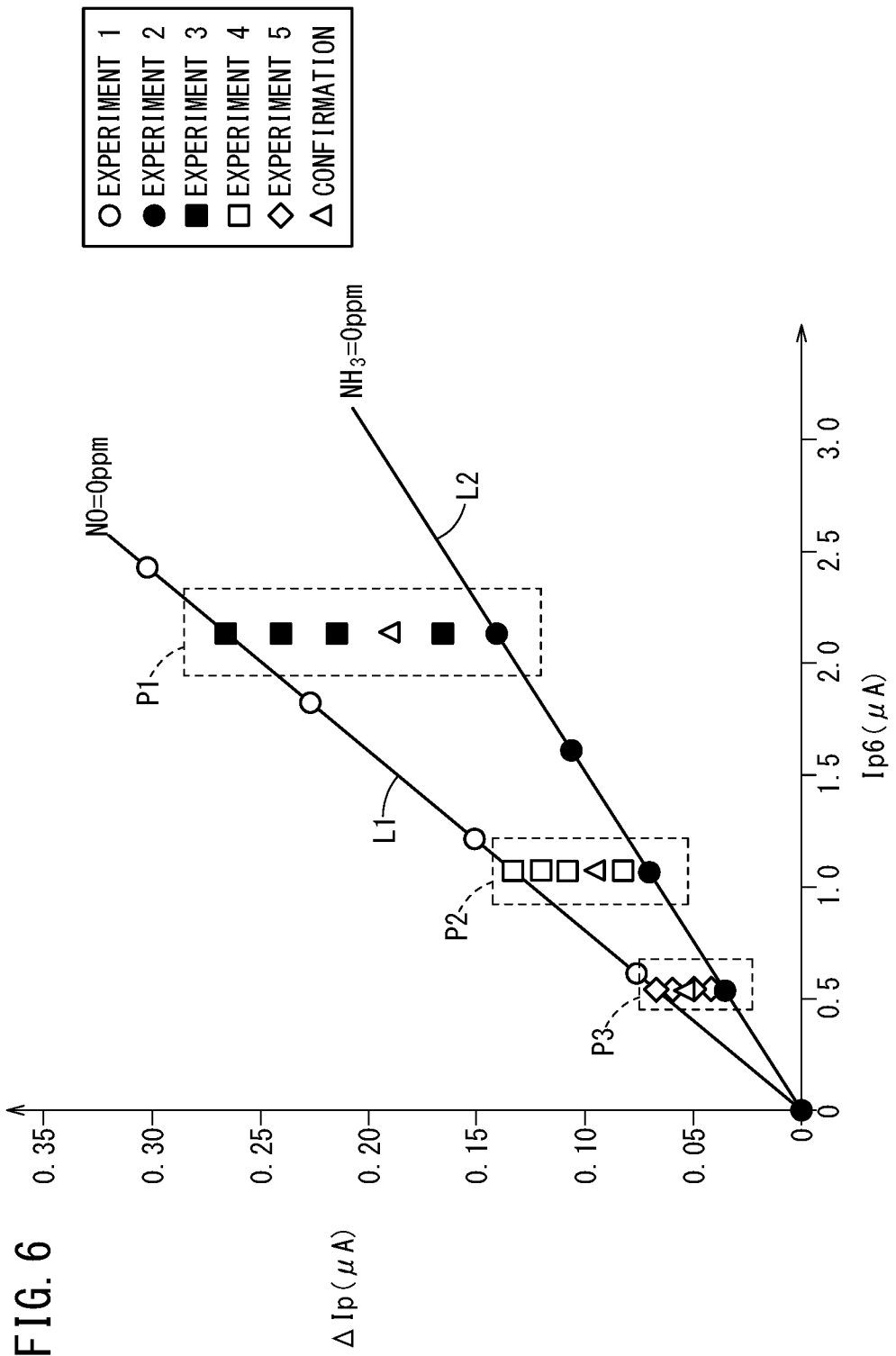
FIG. 6 is a view graphically showing a first map utilized by the first gas sensor.

Accordingly, with the target component concentration acquisition unit 104 (see FIG. 4), the respective concentrations of NO and $NH_3$ can be acquired on the basis of the amount of change $\Delta Ip$ between the first measurement pump current value Ip3 and the second measurement pump current value Ip6, the second measurement pump current value Ip6, and for example, the first map 110A (see FIG. 6).

When the first map 110A is shown graphically, as shown in FIG. 6, a graph is produced in which the second measurement pump current value Ip6 (μA) is set on the horizontal axis, and the amount of change $\Delta Ip$ (μA) between the first measurement pump current value Ip3 and the second measurement pump current value Ip6 is set on the vertical axis. In FIG. 6, there are shown representatively a first characteristic line L1 and a second characteristic line L2, and a first plot group P1, a second plot group P2, and a third plot group P3 of the amount of change $\Delta Ip$, in which the NO concentration conversion values thereof pertain to a 100 ppm system, a 50 ppm system, and a 25 ppm system.

The first characteristic line L1 shows a characteristic, in relation to a case in which the NO concentration conversion value is 0 ppm, i.e., a case in which NO is not contained in the gas to be measured, for cases in which the $NH_3$ concentration conversion value is changed between 0 ppm, 25 ppm, 50 ppm, 75 ppm, and 100 ppm.

The second characteristic line L2 shows a characteristic, in relation to a case in which the $NH_3$ concentration conversion value is 0 ppm, i.e., a case in which $NH_3$ is not contained in the gas to be measured, for cases in which the NO concentration conversion value is changed between 0 ppm, 25 ppm, 50 ppm, 75 ppm, and 100 ppm.

When the graph of FIG. 6 is shown in the form of a table to facilitate understanding, the contents thereof are as shown in FIG. 7. The contents thereof can be determined, for example, by carrying out Experiments 1 to 5, as will be described later.

In the table of FIG. 7, the contents presented in the first section [1] correspond to the first characteristic line L1 of FIG. 6, and the contents presented in the second section [2] correspond to the second characteristic line L2 of FIG. 6. From a comparison of sections [1] and [2], it can be understood that $NH_3$ possesses a sensitivity that is 1.14 times that of NO. Such a feature is manifested on the basis of the difference in the diffusion coefficients of $NH_3$ and NO, and is determined by the temperature of the sensor element 12 and the oxygen concentration within the internal space. Further, in the table of FIG. 7, the contents of the third section [3] correspond to the first plot group P1 of FIG. 6, the contents of the fourth section [4] correspond to the second plot group P2 of FIG. 6, and the contents of the fifth section [5] correspond to the third plot group P3 of FIG. 6.

In addition, referring to the contents of the third section [3], the fourth section [4], and the fifth section [5] in FIG. 7, the NO concentration is acquired by calculating the total concentration (the NO conversion value) based on the second measurement pump current value Ip6, and more specifically, any one of the 100 ppm system, the 50 ppm system, and the 25 ppm system, acquiring the $NH_3$ concentration on the basis of the amount of change $\Delta Ip$, and subtracting the $NH_3$ concentration from the total concentration.

For example, in the case that the second measurement pump current value Ip6 is 0.537 (μA), the fact that the total concentration is 25 ppm is calculated from the fifth section [5] of FIG. 7. In addition, in the case that the amount of change $\Delta Ip$ is 0.041 (μA), the $NH_3$ concentration is 4.4 ppm from the fifth section [5] of FIG. 7. Accordingly, taking into consideration the difference in sensitivity between $NH_3$ and NO, the NO concentration is 25−4.4×1.14=approximately 20.0 ppm.

In the case that no corresponding amount of change $\Delta Ip$ exists on the first map 110A, the amount of change $\Delta Ip$ that is closest thereto on the map may be specified to thereby calculate the total concentration, and together therewith, the $NH_3$ concentration may be determined, for example, by a known approximation calculation. In addition, the NO concentration may be determined by subtracting the approximately determined $NH_3$ concentration from the calculated total concentration. Alternatively, the concentration of $NH_3$ which is the second target component may be calculated on the basis of a correlation equation between the respective concentrations of $NH_3$ and NO, $\Delta Ip$, and Ip6, and the concentration of NO which is the first target component may be calculated by subtracting the concentration of the second target component from the total concentration.

Next, a description will be given concerning an experimental example for the purpose of obtaining the first map 110A.

(1) The above-described sensor element 12 is manufactured, and the metal components are assembled into a sensor shape and attached to a model gas measurement apparatus. In addition, by the first heater 72A and the second heater 72B being incorporated into the sensor element 12, the sensor element 12 is heated to approximately 800° C.

(2) The voltage applied between the first main interior side pump electrode 44A and the exterior side pump electrode 46, as well as the voltage applied between the second main interior side pump electrode 44B and the exterior side pump electrode 46 are feedback-controlled, in a manner so that the electromotive force between the first main interior side pump electrode 44A of the first sensor cell 15A and the reference electrode 52, and the electromotive force between the second main interior side pump electrode 44B of the second sensor cell 15B and the reference electrode 52 become 230 mV.

(3) Next, the voltage applied between the first auxiliary pump electrode 58A and the exterior side pump electrode 46, as well as the voltage applied between the second auxiliary pump electrode 58B and the exterior side pump electrode 46 are feedback-controlled, in a manner so that the electromotive force between the first auxiliary pump electrode 58A of the first sensor cell 15A and the reference electrode 52, and the electromotive force between the second auxiliary pump electrode 58B of the second sensor cell 15B and the reference electrode 52 become 380 mV.

(4) Furthermore, the voltage applied between the first measurement electrode 62A and the exterior side pump electrode 46, as well as the voltage applied between the second measurement electrode 62B and the exterior side pump electrode 46 are feedback-controlled, in a manner so that the electromotive force between the first measurement electrode 62A of the first measurement pump cell 60A and the reference electrode 52 in the first sensor cell 15A, and the electromotive force between the second measurement electrode 62B of the second measurement pump cell 60B and the reference electrode 52 in the second sensor cell 15B become 400 mV.

(5) The voltage applied between the preliminary pump electrode 82 and the exterior side pump electrode 46 is feedback-controlled, in a manner so that the electromotive force between the preliminary pump electrode 82 of the preliminary pump cell 80 in the first sensor cell 15A and the reference electrode 52 becomes 230 mV.

(6) Next, $N_2$ and 3% of $H_2O$ were made to flow as a base gas at 120 L/min to the model gas measurement apparatus, and upon having measured the current flowing to the first measurement pump cell 60A and the second measurement pump cell 60B, the offset current flowing to the first measurement pump cell 60A and the second measurement pump cell 60B was determined to be 0.003 μA.

(7) Next, while $N_2$ and 3% of $H_2O$ continued to flow as a base gas at 120 L/min to the model gas measurement apparatus, and while maintaining a total gas flow rate of 120 L/min, by the addition of $NH_3$ at amounts of 25, 50, 75, and 100 ppm, the first measurement pump current Ip3 and the second measurement pump current Ip6 flowing to the first measurement pump cell 60A and the second measurement pump cell 60B were measured (Experiment 1: refer to the first characteristic line L1 of FIG. 6, and the first section [1] of FIG. 7).

(8) Next, while $N_2$ and 3% of $H_2O$ continued to flow as a base gas at 120 L/min to the model gas measurement apparatus, and while maintaining a total gas flow rate of 120 L/min, by the stepwise addition of NO at amounts of 25, 50, 75, and 100 ppm, the first measurement pump current Ip3 and the second measurement pump current Ip6 flowing to the first measurement pump cell 60A and the second measurement pump cell 60B were measured (Experiment 2: refer to the second characteristic line L2 of FIG. 6, and the second section [2] of FIG. 7).

(9) Next, $N_2$ and 3% of $H_2O$ were made to flow as a base gas into the model gas measurement apparatus at 120 L/min, and the NO concentration was gradually reduced in a stepwise manner to NO=100, 80, 60, 40, 20, and 0 ppm, and with respect to each NO concentration of NO=80, 60, 40, 20, and 0 ppm, $NH_3$ was added to the gas, in a manner so as to maintain the second measurement pump current value Ip6 of the second measurement pump cell 60B at the time that NO=100 ppm at 2.137 μA. At this time, the flow rate of the base gas was adjusted so as to maintain the total gas flow rate at 120 L/min. In each gas atmosphere, the first measurement pump current Ip3 flowing to the first measurement pump cell 60A was measured (Experiment 3). The relationship between the concentrations of NO and $NH_3$, the first measurement pump current value Ip3 and the second measurement pump current value Ip6, and the difference (amount of change ΔIp) between the first measurement pump current value Ip3 and the second measurement pump current value Ip6 is shown by the first plot group P1 of FIG. 6, and the third section [3] of FIG. 7.

(10) Next, $N_2$ and 3% of $H_2O$ were made to flow as a base gas into the model gas measurement apparatus at 120 L/min, and the NO concentration was gradually reduced in a stepwise manner to NO=50, 40, 30, 20, 10, and 0 ppm, and with respect to each NO concentration of NO=40, 30, 20, 10, and 0 ppm, $NH_3$ was added to the gas, in a manner so as to maintain the second measurement pump current value Ip6 of the second measurement pump cell 60B at the time that NO=50 ppm at 1.070 μA. At this time, the flow rate of the base gas was adjusted so as to maintain the total gas flow rate at 120 L/min. In each respective gas atmosphere, the first measurement pump current Ip3 flowing to the first measurement pump cell 60A was measured (Experiment 4). The relationship between the concentrations of NO and $NH_3$, the first measurement pump current value Ip3 and the second measurement pump current value Ip6, and the difference (amount of change ΔIp) between the first measurement pump current value Ip3 and the second measurement pump current value Ip6 is shown by the second plot group P2 of FIG. 6, and the fourth section [4] of FIG. 7.

(11) Next, $N_2$ and 3% of $H_2O$ were made to flow as a base gas into the model gas measurement apparatus at 120 L/min, and the NO concentration was gradually reduced in a stepwise manner to NO=25, 20, 15, 10, 5, and 0 ppm, and with respect to each NO concentration of NO=20, 15, 10, 5, and 0 ppm, $NH_3$ was added to the gas, in a manner so as to maintain the second measurement pump current value Ip6 of the second measurement pump cell 60B at the time that NO=25 ppm at 0.537 μA. At this time, the flow rate of the base gas was adjusted so as to maintain the total gas flow rate at 120 L/min. In each gas atmosphere, the first measurement pump current Ip3 flowing to the first measurement pump cell 60A was measured (Experiment 5). The relationship between the concentrations of NO and $NH_3$, the first measurement pump current value Ip3 and the second measurement pump current value Ip6, and the difference (amount of change ΔIp) between the first measurement pump current value Ip3 and the second measurement pump current value Ip6 is shown by the third plot group P3 of FIG. 6, and the fifth section [5] of FIG. 7.

(12) Using the data obtained in Experiment 1 to Experiment 5, the first map 110A shown in FIG. 6 was created. In order to confirm the certainty of the obtained first map 110A, the first measurement pump current Ip3 and the second measurement pump current Ip6 in the mixed gases of NO and $NH_3$ having concentrations that differ from each other in Experiments 1 to 5, and the difference (amount of change ΔIp) between the first measurement pump current Ip3 and the second measurement pump current Ip6 were measured, whereupon the results shown in FIG. 8 were obtained. When the results of FIG. 8 (indicated by Δ) were plotted on the graph of FIG. 6, the results were in good agreement with the concentrations estimated from the first map 110A.

As described above, the first gas sensor 10A contains the sensor element 12, which has the structural body 14 made of at least an oxygen ion conductive solid electrolyte, and the first sensor cell 15A and the second sensor cell 15B formed in the structural body 14, the temperature control unit 100 that controls the temperature of the sensor element 12, the oxygen concentration control unit 102, and the target component concentration acquisition unit 104.

The first sensor cell 15A is equipped with the first gas introduction port 16A, the first diffusion rate control portion 34A, the preliminary adjustment chamber 22, the second diffusion rate control portion 36A, the first oxygen concentration adjustment chamber 18A, the third diffusion rate control portion 38A, and the first measurement chamber 20A, which are arranged in this order in the gas introduction direction.

The second sensor cell 15B is equipped with the second gas introduction port 16B, the first diffusion rate control portion 34B, the diffusion resistance adjustment chamber 24, the second diffusion rate control portion 36B, the second oxygen concentration adjustment chamber 18B, the third diffusion rate control portion 38B, and the second measurement chamber 20B, which are arranged in this order in the gas introduction direction.

The first measurement chamber 20A of the first sensor cell 15A is equipped with the first measurement pump cell 60A, and the second measurement chamber 20B of the second sensor cell 15B is equipped with the second measurement pump cell 60B. The oxygen concentration control unit 102 controls the oxygen concentration of the preliminary adjustment chamber 22 and the first oxygen concentration adjustment chamber 18A of the first sensor cell 15A, as well as the oxygen concentration of the second oxygen concentration adjustment chamber 18B of the second sensor cell 15B.

In addition, in the target component concentration acquisition unit 104, the concentration of the second target component (for example, $NH_3$) is acquired on the basis of the difference (amount of change $\Delta Ip$) between the first measurement pump current value Ip3 flowing to the first measurement pump cell 60A, and the second measurement pump current value Ip6 flowing to the second measurement pump cell 60B, the total concentration of the first target component (for example, NO) and the second target component (for example, $NH_3$) is acquired by the second measurement pump current value Ip6 flowing to the second measurement pump cell 60B, and the concentration of the first target component is acquired by subtracting the concentration of the second target component from the total concentration.

Due to having such a configuration, it is possible for the first gas sensor 10A to accurately measure each of the concentrations of a plurality of target components over a prolonged period, even under an atmosphere of a non-combusted component such as exhaust gas, and a plurality of target components (for example, NO and $NH_3$) that coexist in the presence of oxygen.

In addition, merely by changing the software of the control system of the first gas sensor 10A, the first gas sensor 10A is capable of easily realizing the process of measuring each of the concentrations of NO and $NH_3$ which heretofore could not be realized, without separately adding various measurement devices or the like as hardware. As a result, it is possible to improve the accuracy of controlling a NOx purification system and detecting failures thereof. In particular, it is possible to distinguish between NO and $NH_3$ in exhaust gas downstream of an SCR system, which contributes to precisely controlling the injected amount of urea, as well as detecting deterioration of the SCR system.

Further, the exterior side pump electrode 46 disposed on the outer side of at least the first oxygen concentration adjustment chamber 18A of the first sensor cell 15A, and the exterior side pump electrode 46 disposed on the outer side of the second oxygen concentration adjustment chamber 18B of the second sensor cell 15B are provided in common, and therefore, the number of lead wires can be reduced, and for example, installation thereof on various types of vehicles can be facilitated.

Since the reference electrode 52 disposed in the reference gas introduction space 41 of the first sensor cell 15A, and the reference electrode 52 disposed in the reference gas introduction space 41 of the second sensor cell 15B are provided in common, the number of lead wires can be reduced, and installation thereof on an automotive vehicle or the like can be facilitated.

Next, a gas sensor (hereinafter referred to as a second gas sensor 10B) according to a second embodiment will be described with reference to FIGS. 9 and 10.

Figure 9:
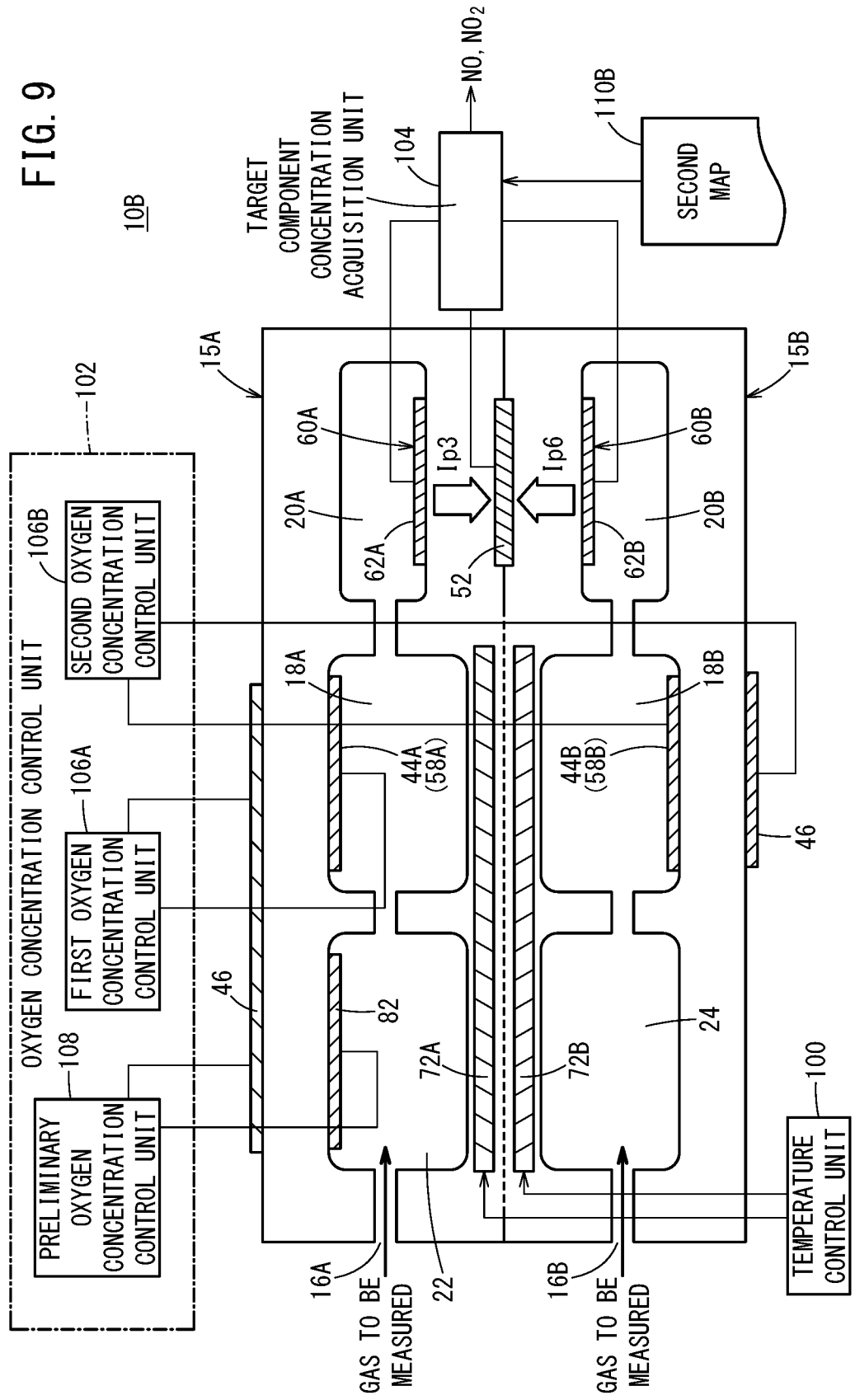
FIG. 9 is a configuration diagram schematically showing the second gas sensor.
Figure 10:
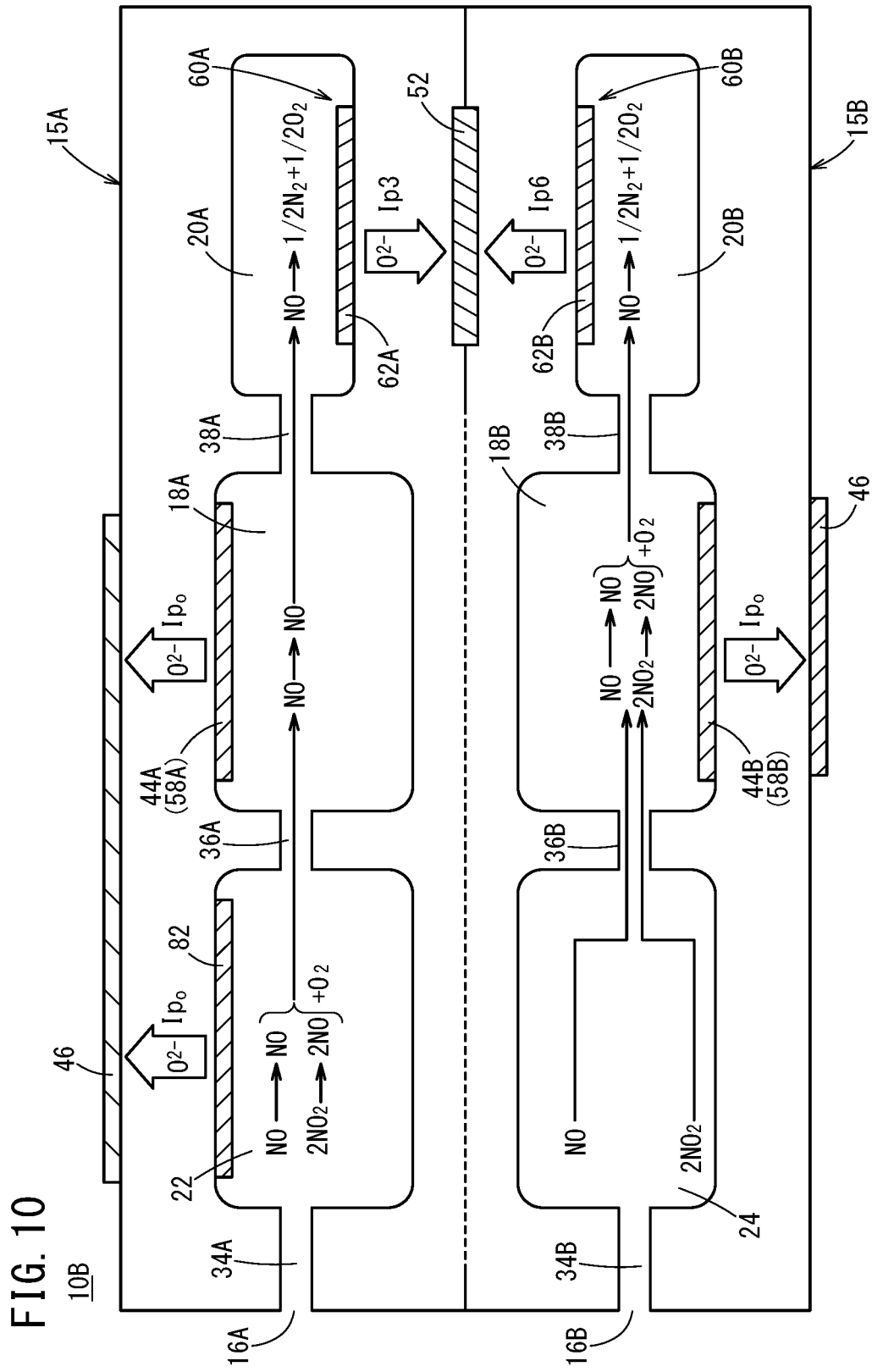
FIG. 10 is an explanatory diagram schematically showing reactions inside a preliminary adjustment chamber, inside a first oxygen concentration adjustment chamber, and inside a first measurement chamber of a first sensor cell in a second gas sensor, as well as reactions inside a diffusion resistance adjustment chamber, inside a second oxygen concentration adjustment chamber, and inside a second measurement chamber of a second sensor cell in the second gas sensor.

The second gas sensor 10B is equipped with a first sensor cell 15A and a second sensor cell 15B having the same configuration as that of the first sensor cell 15A and the second sensor cell 15B of the aforementioned first gas sensor 10A shown in FIGS. 1 to 3, however, as shown in FIGS. 9 and 10, differs therefrom in that the second target component is $NO_2$ and that the concentration of the first target component (NO) and the concentration of the second target component ($NO_2$) are acquired based on a second map 110B.

More specifically, by the oxygen concentration control unit 102 or the temperature control unit 100, or alternatively, by the oxygen concentration control unit 102 and the temperature control unit 100, the second gas sensor 10B performs a control so as to convert all of the $NO_2$ into NO, without causing decomposition of NO inside the first oxygen concentration adjustment chamber 18A and the second oxygen concentration adjustment chamber 18B.

On the basis of the preset oxygen concentration condition, and the preliminary electromotive force V0 generated in the preliminary oxygen partial pressure detecting sensor cell 84 (see FIG. 2), the preliminary oxygen concentration control unit 108 of the oxygen concentration control unit 102 feedback-controls the preliminary variable power source 86, thereby adjusting the oxygen concentration inside the preliminary adjustment chamber 22 to a concentration in accordance with the condition. By the preliminary oxygen concentration control unit 108, all of the $NO_2$ is converted into NO, without causing decomposition of NO inside the preliminary adjustment chamber 22 in the first sensor cell 15A.

Next, processing operations of the second gas sensor 10B will be described with reference also to FIG. 10.

First, in the first sensor cell 15A, as shown in FIG. 10, the $NO_2$ introduced into the preliminary adjustment chamber 22 through the first gas introduction port 16A is subjected to a decomposition reaction of $NO_2 \rightarrow NO$ inside the preliminary adjustment chamber 22, whereupon all of the $NO_2$ introduced through the first gas introduction port 16A is converted into NO.

Accordingly, although the $NO_2$ passes through the first diffusion rate control portion 34A at the $NO_2$ diffusion coefficient, after having passed through the second diffusion rate control portion 36A, which is positioned on the back side of the preliminary adjustment chamber 22, movement into the first measurement chamber 20A occurs at the NO diffusion coefficient.

On the other hand, in the second sensor cell 15B, the $NO_2$ that was introduced through the second gas introduction port 16B reaches the second oxygen concentration adjustment chamber 18B. In the second oxygen concentration adjustment chamber 18B, by operation of the second oxygen concentration control unit 106B of the oxygen concentration control unit 102, a control is performed so as to convert all of the $NO_2$ into NO, and therefore, the $NO_2$ that has flowed into the second oxygen concentration adjustment chamber 18B causes a decomposition reaction of $NO_2 \rightarrow NO$ to occur inside the second oxygen concentration adjustment chamber 18B, and all of the $NO_2$ inside the second oxygen concentration adjustment chamber 18B is converted into NO. Accordingly, the $NO_2$ that was introduced through the second gas introduction port 16B passes through the first diffusion rate control portion 34B and the second diffusion rate control portion 36B at the $NO_2$ diffusion coefficient, and after being converted into NO inside the second oxygen concentration adjustment chamber 18B, passes through the third diffusion rate control portion 38B at the NO diffusion coefficient, and moves into the adjacent second measurement chamber 20B.

More specifically, in the first sensor cell 15A, the location where the decomposition reaction of $NO_2$ takes place is the preliminary adjustment chamber 22, and in the second sensor cell 15B, the location where the decomposition reaction of $NO_2$ takes place is the second oxygen concentration adjustment chamber 18B. Since NO and $NO_2$ each possess different diffusion coefficients, the difference between passing through the second diffusion rate control portions (36A and 36B) with NO and passing therethrough with $NO_2$ corresponds to a difference in the amount of NO that flows into the first measurement chamber 20A and the second measurement chamber 20B. Such a feature brings about a difference between the first measurement pump current value Ip3 of the first measurement pump cell 60A, and the second measurement pump current value Ip6 of the second measurement pump cell 60B. However, significantly, the second measurement pump current value Ip6 of the second measurement pump cell 60B corresponds to the total value of the $NO_2$ concentration and the NO concentration within the measurement gas.

Additionally, the amount of change ΔIp between the first measurement pump current value Ip3 and the second measurement pump current value Ip6 is uniquely determined by the concentration of $NO_2$ within the gas to be measured. Therefore, each of the concentrations of NO and $NO_2$ can be obtained from the second measurement pump current value Ip6 (the total concentration of NO and $NO_2$) that flows to the second measurement pump cell 60B, and the aforementioned amount of change ΔIp (the $NO_2$ concentration).

Accordingly, with the target component concentration acquisition unit 104, each of the concentrations of NO and $NO_2$ can be acquired on the basis of the amount of change ΔIp between the first measurement pump current value Ip3 and the second measurement pump current value Ip6, the second measurement pump current value Ip6, and for example, the second map 110B (see FIG. 9).

Although not illustrated, in the second map 110B, by performing the same experiments as in Experiment 1 to Experiment 5 for creating the aforementioned first map 110A (see FIGS. 6 and 7), a graph, and more specifically, a graph and a table corresponding to the second gas sensor 10B, can be created in which the second measurement pump current value Ip6 (μA) is set on the horizontal axis, and the amount of change ΔIp (μA) between the first measurement pump current value Ip3 and the second measurement pump current value Ip6 is set on the vertical axis.

Due to having such a configuration, it is possible for the second gas sensor 10B to accurately measure each of the concentrations of a plurality of target components over a prolonged period, even under an atmosphere of a non-combusted component such as exhaust gas, and a plurality of target components (for example, NO and $NO_2$) that coexist in the presence of oxygen.

In addition, merely by changing the software of the control system of the second gas sensor 10B, the second gas sensor 10B is capable of easily realizing the process of measuring each of the concentrations of NO and $NO_2$ which heretofore could not be realized, without separately adding various measurement devices or the like as hardware. As a result, it is possible to improve the accuracy of controlling a NOx purification system and detecting failures thereof. In particular, it is possible to distinguish between NO and $NO_2$ in exhaust gas downstream of a DOC catalyst (Diesel Oxidation Catalyst), which contributes to detecting deterioration of the DOC catalyst.

Next, a gas sensor (hereinafter referred to as a third gas sensor 10C) according to a third embodiment will be described further with reference to FIGS. 11 and 12.

Figure 11:
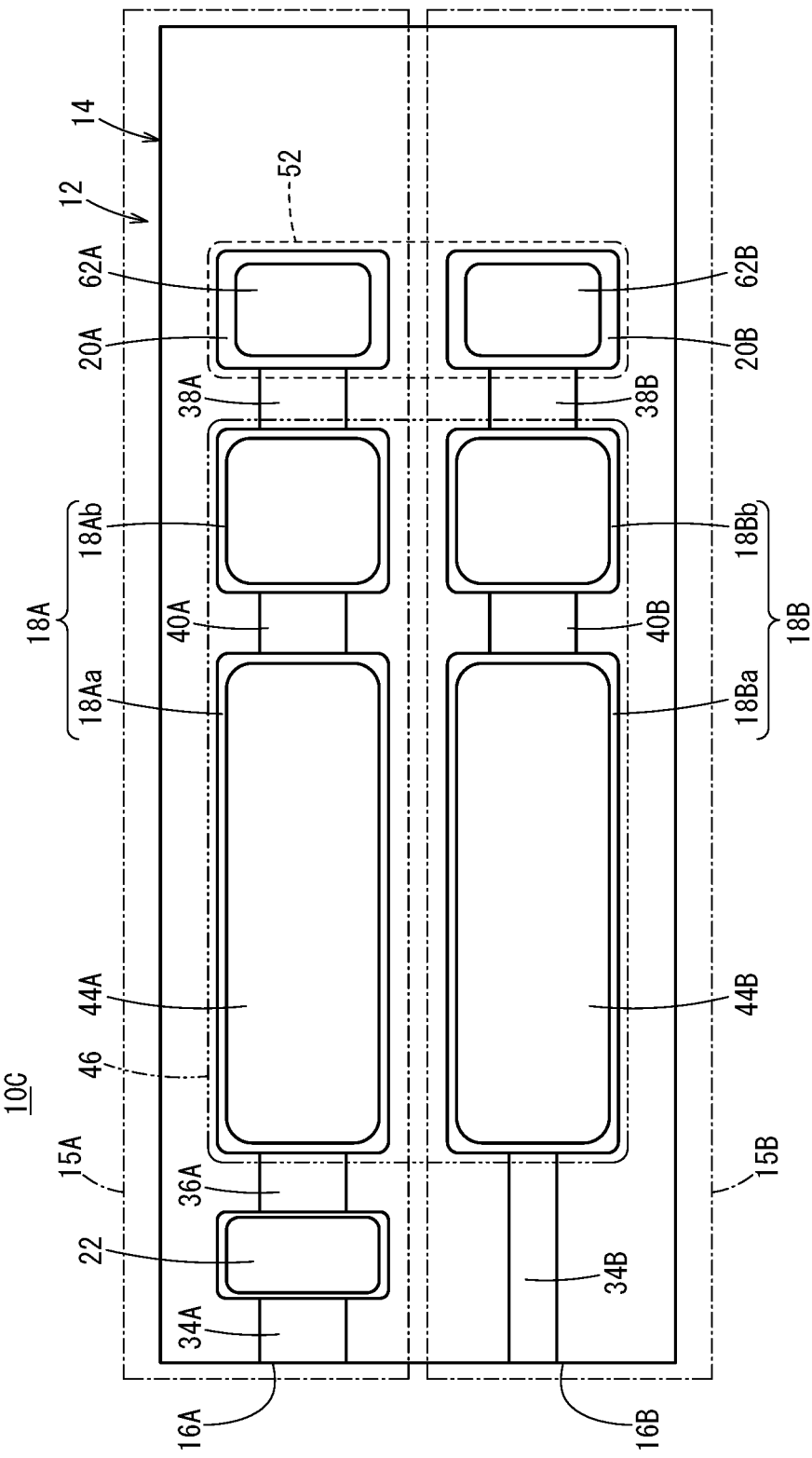
FIG. 11 is a cross-sectional view in which there is shown a structural example of a gas sensor (third gas sensor) according to a third embodiment (dashed lines omitted)
Figure 12:
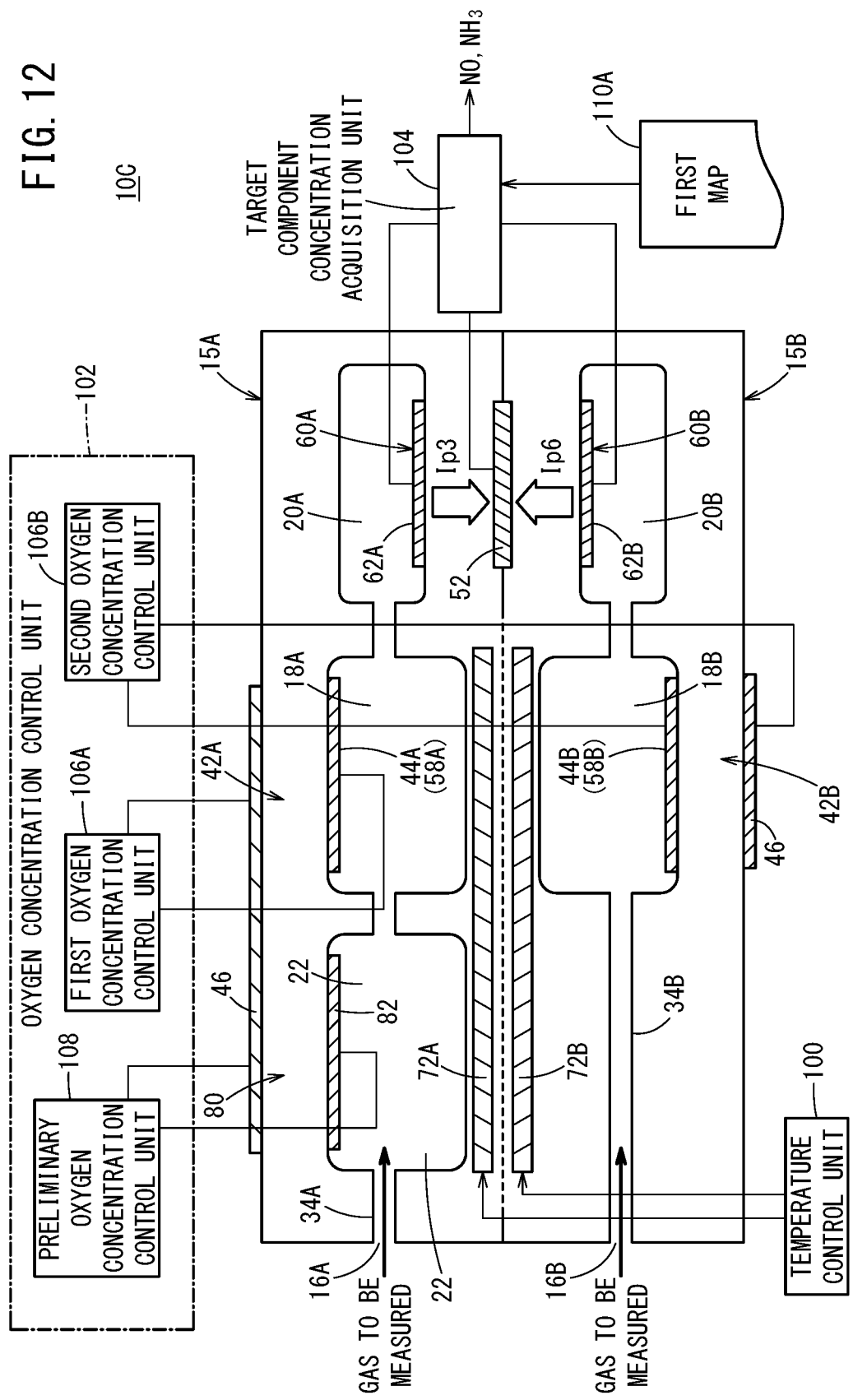
FIG. 12 is a configuration diagram schematically showing the third gas sensor.

As shown in FIGS. 11 and 12, the third gas sensor 10C has an element structure in which the second gas introduction port 16B and the second main adjustment chamber 18Ba communicate directly with each other via the first diffusion rate control portion 34B. The diffusion resistance value of the first diffusion rate control portion 34B is adjusted to be substantially equivalent to the total value of the diffusion resistance values of the first gas introduction port 16A, the first diffusion rate control portion 34A, the preliminary adjustment chamber 22, and the second diffusion rate control portion 36A, of the first sensor cell 15A. With this configuration, the diffusion resistance adjustment chamber 24 and the second diffusion rate control portion 36B of the second sensor cell 15B (see FIGS. 1 and 4) can be omitted, and by means of a simpler structure, for example, in the case of being attached to a vehicle, an element structure can be provided which is resistant to thermal shocks.

Next, a gas sensor (hereinafter referred to as a fourth gas sensor 10D) according to a fourth embodiment will be described with reference to FIGS. 13 and 14.

Figure 13:
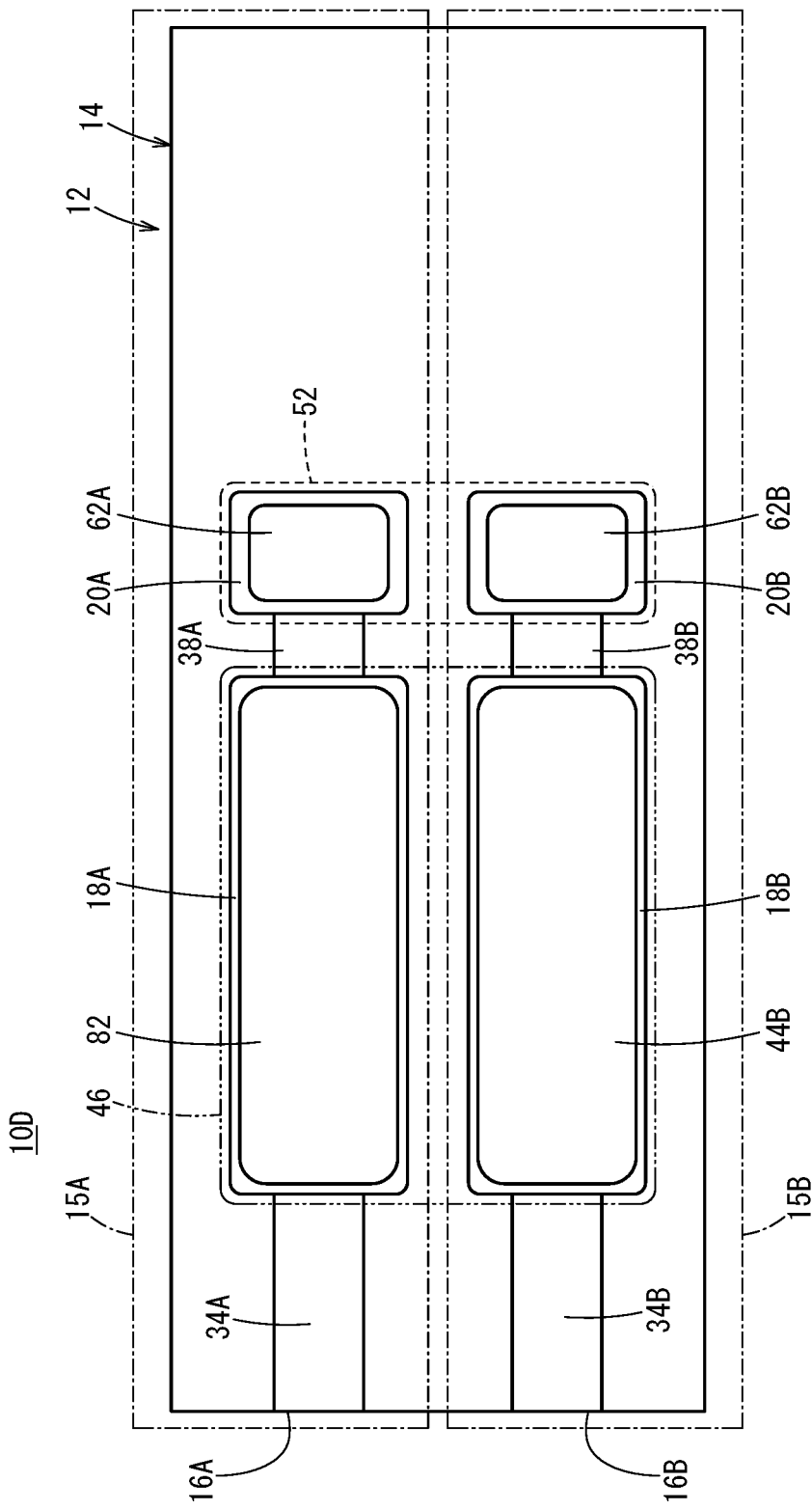
FIG. 13 is a cross-sectional view in which there is shown a structural example of a gas sensor (fourth gas sensor) according to a fourth embodiment (dashed lines omitted)
Figure 14:
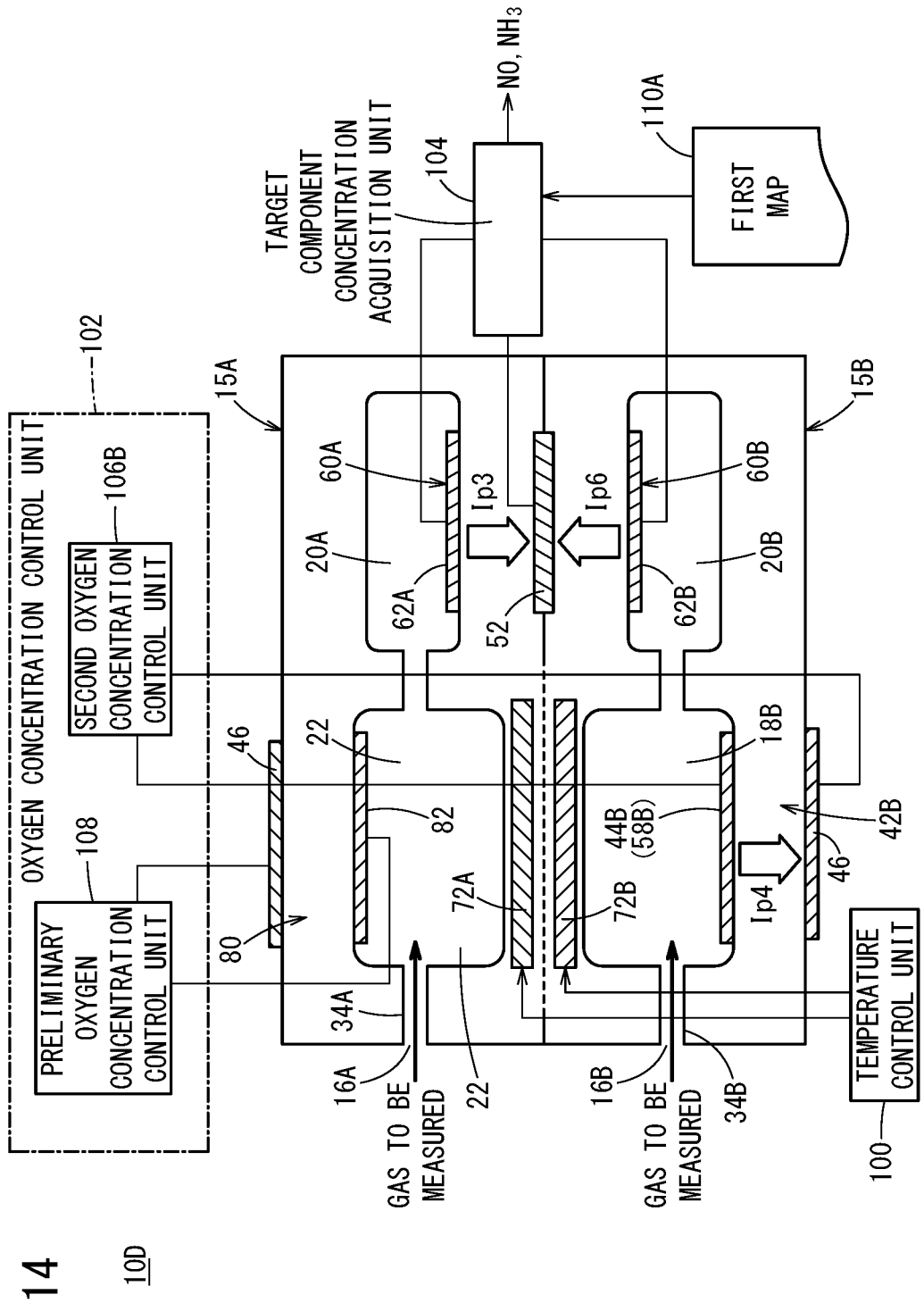
FIG. 14 is a configuration diagram schematically showing the fourth gas sensor.

In the fourth gas sensor 10D, as shown in FIG. 13, the fourth diffusion rate control portion 40A and the first auxiliary adjustment chamber 18Ab are omitted from the first sensor cell 15A of the above-described first gas sensor 10A (see FIGS. 1 and 4). In place thereof, the first oxygen concentration adjustment chamber 18A and the first measurement chamber 20A are placed in direct communication via the third diffusion rate control portion 38A.

Similarly, the diffusion resistance adjustment chamber 24, the second diffusion rate control portion 36B, the fourth diffusion rate control portion 40B, and the second auxiliary adjustment chamber 18Bb are omitted from the second sensor cell 15B of the first gas sensor 10A (see FIGS. 1 and 4). In place thereof, the second gas introduction port 16B and the second oxygen concentration adjustment chamber 18B are placed in direct communication via the first diffusion rate control portion 34B, and the second oxygen concentration adjustment chamber 18B and the second measurement chamber 20B are placed in direct communication via the third diffusion rate control portion 38B.

In this case, the first measurement pump current Ip3 of the first sensor cell 15A and the second measurement pump current Ip6 of the second sensor cell 15B are corrected, for example, on the basis of the fourth pump current value Ip4 flowing to the second main pump cell 42B that is disposed inside the second oxygen concentration adjustment chamber 18B of the second sensor cell 15B. More specifically, a form is adopted in which an oxygen concentration correction unit, which is effective in correcting the first measurement pump current Ip3 and the second measurement pump current Ip6, is added to the oxygen concentration control unit 102 or the target component concentration acquisition unit 104. By the addition of such an oxygen concentration correction unit, with an inexpensive and simple structure having a small number of lead wires, it is possible to provide an element structure that is resistant to thermal shocks in the case of being attached to a vehicle.

Figure 15:
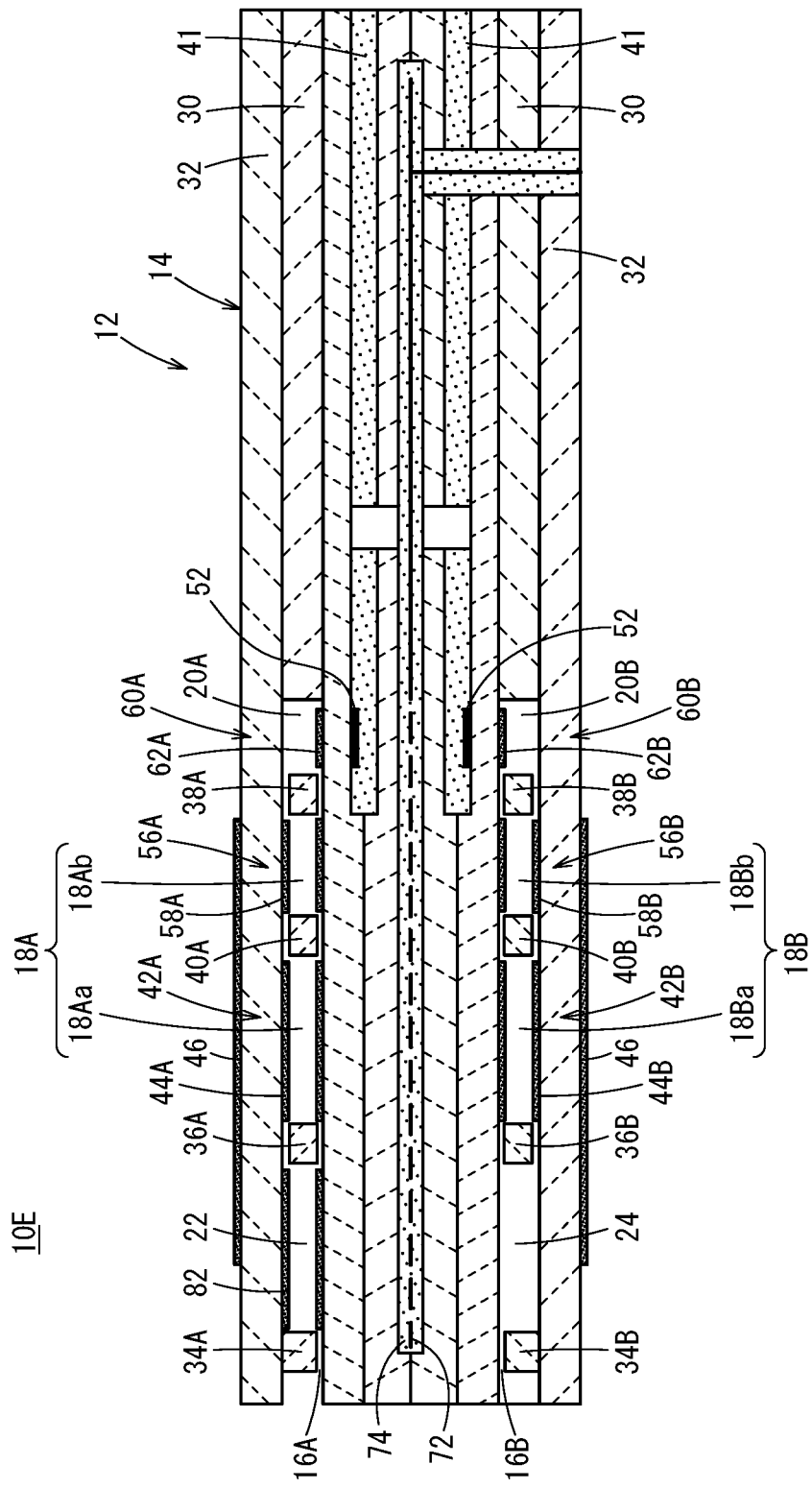
FIG. 15 is a cross-sectional view in which there is shown a structural example of a gas sensor (fifth gas sensor) according to a fifth embodiment.

Next, a gas sensor (hereinafter referred to as a fifth gas sensor 10E) according to a fifth embodiment will be described with reference to FIG. 15.

The first sensor cell 15A and the second sensor cell 15B need not necessarily be formed on the same plane, and may be arranged symmetrically in the stacking direction of the solid electrolyte substrate, or stated otherwise, in the thickness direction of the sensor element 12, while sandwiching a heating unit (the heater 72 and the heater insulating layer 74) therebetween. In this case, the dimension in the widthwise direction of the sensor element 12 can be made smaller, which is effective in minimizing the size and scale of the sensor element 12.

The essence and gist of the present invention is characterized by the following items (a) to (c), and the reaction by which $NH_3$ or $NO_2$ is changed into NO can be arbitrarily selected from within a range in which a variation in the sensor outputs can be obtained.

(a) A reaction is intentionally generated in which $NH_3$ or $NO_2$ changes into NO before and after a diffusion rate control portion possessing a predetermined diffusion resistance.

(b) According to item (a), the concentration of $NH_3$ or $NO_2$ is determined from a variation in the sensor outputs caused by a difference between the diffusion coefficients of NO and $NH_3$, or the diffusion coefficients of NO and $NO_2$.

(c) Furthermore, the NO concentration is obtained by comparing the total concentrations of NO and $NH_3$ or the total concentrations of NO and $NO_2$ obtained by the sensor output itself with the concentration of $NH_3$ or $NO_2$ obtained due to the variation.

The gas sensor according to the present invention is not limited to the embodiments described above, and it is a matter of course that various configurations could be adopted therein without deviating from the essence and gist of the present invention.

In the example discussed above, in the first sensor cell 15A, the first measurement chamber 20A is disposed adjacent to the first auxiliary adjustment chamber 18Ab, and the first measurement electrode 62A is arranged inside the first measurement chamber 20A. However, apart therefrom, although not illustrated, the first measurement electrode 62A may be arranged inside the first auxiliary adjustment chamber 18Ab, and a film made of a ceramic porous body such as alumina ($Al_2O_3$) serving as the third diffusion rate control portion 38A may be formed in a manner so as to cover the first measurement electrode 62A. In this case, the surrounding periphery of the first measurement electrode 62A functions as the first measurement chamber 20A.

The same features may also be applied to the second sensor cell 15B, and the second measurement electrode 62B may be arranged inside the second auxiliary adjustment chamber 18Bb, and a film made of a ceramic porous body such as alumina ($Al_2O_3$) serving as the third diffusion rate control portion 38B may be formed, in a manner so as to cover the second measurement electrode 62B. In this case, the surrounding periphery of the second measurement electrode 62B functions as the second measurement chamber 20B.

Further, in the above example, $NH_3$ or $NO_2$ as the second target component is converted into NO inside the preliminary adjustment chamber 22 at a conversion ratio of 100%. However, the conversion ratio of $NH_3$ or $NO_2$ need not necessarily be 100%, and the conversion ratio can be set arbitrarily, within a range in which a correlation with good reproducibility with the $NH_3$ concentration or the $NO_2$ concentration within the gas to be measured is obtained.

Further, driving of the preliminary oxygen concentration control unit 108 may be performed in a direction of pumping oxygen out from the interior of the preliminary adjustment chamber 22, or in a direction of pumping oxygen into the preliminary adjustment chamber 22, and it is sufficient insofar as the measurement pump currents Ip3 and Ip6, which are outputs of the measurement pump cell, change with good reproducibility due to the presence of $NH_3$ or $NO_2$ that serves as the second target component.

In practicing the present invention, various configurations for improving reliability may be added as components for an automotive vehicle to such an extent that the concept of the present invention is not impaired.

The invention claimed is:

1. A gas sensor configured to measure concentrations of a first target component and a second target component, comprising:

a sensor element including a structural body made up from at least an oxygen ion conductive solid electrolyte, and a first sensor cell and a second sensor cell formed in the structural body; and a temperature controller configured to control a temperature of the sensor element;

each of the first sensor cell and the second sensor cell including a gas introduction port, a first diffusion rate control portion, a first chamber, a second diffusion rate control portion, a second chamber, a third diffusion rate control portion, and a measurement chamber, which are serially arranged in this order;

a preliminary adjustment pump cell disposed inside the first chamber of the first sensor cell;

the measurement chamber of the first sensor cell being equipped with a first target component measurement pump cell;

the measurement chamber of the second sensor cell being equipped with a second target component measurement pump cell;

an oxygen concentration controller configured to control oxygen concentrations of the first chamber and the second chamber of the first sensor cell, and an oxygen concentration of the second chamber of the second sensor cell; and a processor coupled to a memory storing instructions that when executed by the processor configure the processor to:

acquire a concentration of the second target component based on a difference between a current value flowing to the first target component measurement pump cell, and a current value flowing to the second target component measurement pump cell;

acquire a total concentration of the first target component and the second target component by the current value flowing to the second target component measurement pump cell; and acquire a concentration of the first target component by subtracting the concentration of the second target component from the total concentration.

2. The gas sensor according to claim 1, further comprising:

a first oxygen concentration adjustment pump cell disposed inside the second chamber of the first sensor cell, and a second oxygen concentration adjustment pump cell disposed inside the second chamber of the second sensor cell; and wherein the oxygen concentration controller further includes:

a preliminary oxygen concentration controller configured to control the oxygen concentration of the first chamber of the first sensor cell by controlling the preliminary adjustment pump cell;

a first oxygen concentration controller configured to control the oxygen concentration of the second chamber of the first sensor cell by controlling the first oxygen concentration adjustment pump cell; and a second oxygen concentration controller configured to control the oxygen concentration of the second chamber of the second sensor cell by controlling the second oxygen concentration adjustment pump cell.

3. The gas sensor according to claim 2, wherein the oxygen concentration controller is further configured to measure an oxygen concentration based on a pump current value flowing to the second oxygen concentration adjustment pump cell.

4. The gas sensor according to claim 1, wherein:
the second chamber of the first sensor cell includes a first main adjustment chamber in communication with the first chamber of the first sensor cell, and a first auxiliary adjustment chamber in communication with the first main adjustment chamber;
the second chamber of the second sensor cell includes a second main adjustment chamber in communication with the first chamber of the second sensor cell, and a second auxiliary adjustment chamber in communication with the second main adjustment chamber;
the measurement chamber of the first sensor cell is in communication with the first auxiliary adjustment chamber; and
the measurement chamber of the second sensor cell is in communication with the second auxiliary adjustment chamber.

5. The gas sensor according to claim 4, wherein, in each of the first and second sensor cells includes fourth diffusion rate control portions, respectively, between the first main adjustment chamber and the first auxiliary adjustment chamber, and between the second main adjustment chamber and the second auxiliary adjustment chamber.

6. The gas sensor according to claim 1, wherein:
pump electrodes are included respectively in the first chamber and the second chamber of the first sensor cell, and the second chamber of the second sensor cell;
measurement electrodes are included respectively in the measurement chamber of the first sensor cell and the measurement chamber of the second sensor cell; and
each of the pump electrodes is made of a material having a catalytic activity lower than that of the respective measurement electrodes.

7. The gas sensor according to claim 6, wherein a first exterior side pump electrode disposed on an outer side of at least the second chamber of the first sensor cell, and a second exterior side pump electrode disposed on an outer side of at least the second chamber of the second sensor cell are provided in common.

8. The gas sensor according to claim 1, wherein the first target component is NO, and the second target component is $NH_3$.

9. The gas sensor according to claim 8, wherein the oxygen concentration controller:
controls the oxygen concentration inside the first chamber under a condition in which $NH_3$ is oxidized without causing decomposition of NO inside the first chamber of the first sensor cell; and
controls the oxygen concentration inside the second chamber under a condition in which $NH_3$ is oxidized without causing decomposition of NO inside the second chamber of the second sensor cell.

10. The gas sensor according to claim 8, wherein:
a first map is stored in the memory, in which there is recorded a relationship between a NO concentration and an $NH_3$ concentration, respectively, by a current value flowing to the second target component measurement pump cell, and a difference between a current value flowing to the first target component measurement pump cell and the current value flowing to the second target component measurement pump cell, the current value and the difference being experimentally measured in advance; and
the processor is further configured to determine each of concentrations of NO and $NH_3$ by comparing with the first map the current value flowing to the second target component measurement pump cell during actual use, and the difference between the current value flowing to the first target component measurement pump cell and the current value flowing to the second target component measurement pump cell.

11. The gas sensor according to claim 1, wherein the first target component is NO, and the second target component is $NO_2$.

12. The gas sensor according to claim 11, wherein the oxygen concentration controller is further configured to:
control the oxygen concentration inside the first chamber under a condition in which $NO_2$ is decomposed without causing decomposition of NO inside the first chamber of the first sensor cell; and
control the oxygen concentration inside the second chamber under a condition in which $NO_2$ is decomposed without causing decomposition of NO inside the second chamber of the second sensor cell.

13. The gas sensor according to claim 11, wherein:
a second map is stored in the memory, in which there is recorded a relationship between a NO concentration and a $NO_2$ concentration, respectively, by a current value flowing to the second target component measurement pump cell, and a difference between a current value flowing to the first target component measurement pump cell and the current value flowing to the second target component measurement pump cell, the current value and the difference being experimentally measured in advance; and
the processor is further configured to determine each of concentrations of NO and $NO_2$ by comparing with the second map the current value flowing to the second target component measurement pump cell during actual use, and the difference between the current value flowing to the first target component measurement pump cell and the current value flowing to the second target component measurement pump cell.

14. The gas sensor according to claim 1, wherein:
the first target component measurement pump cell includes a first measurement electrode disposed inside the measurement chamber of the first sensor cell, and a first reference electrode disposed inside a reference gas introduction space of the sensor element;
the second target component measurement pump cell includes a second measurement electrode disposed inside the measurement chamber of the second sensor cell, and a second reference electrode disposed inside the reference gas introduction space of the sensor element; and
the first reference electrode and the second reference electrode are provided in common.

15. The gas sensor according to claim 1, wherein the first sensor cell and the second sensor cell are disposed substantially symmetrically in a thickness direction of the sensor element.

16. The gas sensor according to claim 1, wherein the second sensor cell has an element structure in which the gas introduction port and the second chamber communicate directly with each other via the first diffusion rate control portion, and a diffusion resistance value of the first diffusion rate control portion of the second sensor cell is substantially equivalent to a total value of diffusion resistance values of the gas introduction port, the first diffusion rate control portion, the first chamber, and the second diffusion rate control portion, of the first sensor cell.

* * * * *